United States Patent
Close et al.

(10) Patent No.: US 11,274,238 B2
(45) Date of Patent: *Mar. 15, 2022

(54) REFRIGERANT, HEAT TRANSFER COMPOSITIONS, METHODS, AND SYSTEMS

(71) Applicant: HONEYWELL INTERNATIONAL INC., Morris Plains, NJ (US)

(72) Inventors: Joshua Close, Cheektowaga, NY (US); Ankit Sethi, Buffalo, NY (US); Samuel F. Yana Motta, East Amherst, NY (US); Michael Petersen, Clarence Center, NY (US); Gustavo Pottker, Getzville, NY (US); Ronald Peter Vogl, Springville, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,829

(22) Filed: May 19, 2020

(65) Prior Publication Data

US 2021/0071056 A1    Mar. 11, 2021

Related U.S. Application Data

(63) Continuation of application No. 15/870,597, filed on Jan. 12, 2018, now Pat. No. 10,655,040.

(60) Provisional application No. 62/522,836, filed on Jun. 21, 2017, provisional application No. 62/522,860, filed on Jun. 21, 2017, provisional application No. 62/522,846, filed on Jun. 21, 2017, provisional application No. 62/522,851, filed on Jun. 21, 2017, provisional application No. 62/445,800, filed on Jan. 13, 2017, provisional application No. 62/445,816, filed on Jan. 13, 2017.

(51) Int. Cl.
C09K 5/04    (2006.01)

(52) U.S. Cl.
CPC ........ C09K 5/045 (2013.01); *C09K 2205/126* (2013.01); *C09K 2205/22* (2013.01); *C09K 2205/40* (2013.01)

(58) Field of Classification Search
CPC ...................... C09K 2205/126; C09K 2205/22
See application file for complete search history.

(56) References Cited

U.S. PATENT DOCUMENTS

| | | | |
|---|---|---|---|
| 10,655,040 B2 * | 5/2020 | Close | C09K 5/045 |
| 2012/0128964 A1 | 5/2012 | Hulse et al. | |
| 2016/0024362 A1 | 1/2016 | Zhili et al. | |

OTHER PUBLICATIONS

Extended European Search report from EP 18 73 9154.5 dated Jul. 20, 2020.

* cited by examiner

*Primary Examiner* — John R Hardee
(74) *Attorney, Agent, or Firm* — Colleen D. Szuch

(57) ABSTRACT

Disclosed are refrigerants, and heat transfer compositions, heat transfer systems and heat transfer methods containing such refrigerants, wherein the refrigerant comprises at least about 97% by weight of the following three components (a)-(c) and the following fourth component if present:
(a) trans-1-chloro-3,3,3-trifluoropropene (HFCO-1233zd (E)),
(b) trans-1,3,3,3-tetrafluoropropene (HFO-1234ze(E)),
(c) trifluoroiodomethane (CF3I), and.
(d) 1,1,1,2,3,3,3-heptafluoropropane (HFC-227ea).

16 Claims, 5 Drawing Sheets

REFRIGERANT, HEAT TRANSFER COMPOSITIONS, METHODS, AND SYSTEMS

CROSS REFERENCE TO RELATED APPLICATIONS

The present application is a continuation of U.S. application Ser. No. 15/870,597, filed Jan. 12, 2018, (now U.S. Pat. No. 10,655,040, issued May 19, 2020) which application claims the priority benefit of each of U.S. Provisional Application Nos. 62/445,800 and 62/445,816, each of which was filed on Jan. 13, 2017 and each of which is incorporated herein by reference.

The present application also claims the priority benefit of each of US Provisional Application Nos. 62/522,836; 62/522,846; 62/522,851; and 62/522,860, each of which was filed on Jun. 21, 2017 and each of which is incorporated herein by reference.

FIELD OF THE INVENTION

The present invention relates to compositions, methods and systems having utility in a heat exchange system, including refrigeration applications and in particular aspects to compositions for replacement of the refrigerant R-134a for heating and cooling applications and to retrofitting heat exchange systems, including systems which contain R-134a.

BACKGROUND

Mechanical refrigeration systems, and related heat transfer devices, such as heat pumps and air conditioners, using refrigerant liquids are well known in the art for industrial, commercial and domestic uses. Chlorofluorocarbons (CFCs) were developed in the 1930s as refrigerants for such systems. However, since the 1980s the effect of CFCs on the stratospheric ozone layer has become the focus of much attention. In 1987, a number of governments signed the Montreal Protocol to protect the global environment, setting forth a timetable for phasing out the CFC products. CFCs were replaced with more environmentally acceptable materials that contain hydrogen, namely the hydrochlorofluorocarbons (HCFCs).

One of the most commonly used hydrochlorofluorocarbon refrigerants was chlorodifluoromethane (HCFC-22). However, subsequent amendments to the Montreal protocol accelerated the phase out of the CFCs and also scheduled the phase-out of HCFCs, including HCFC-22.

In response to the requirement for a non-flammable, non-toxic alternative to the CFCs and HCFCs, industry has developed a number of hydrofluorocarbons (HFCs) which have zero ozone depletion potential. R-134a (1,1,1,2-tetrafluoroethane) was adopted for various heat exchange applications, including refrigeration applications such as medium temperature refrigeration systems and vending machines, as well as heat pumps and chillers, as it does not contribute to ozone depletion.

However, R-134a has a Global Warming Potential (GWP) of about 1430 (according to IPCC (2007) Climate Change 2007: The Physical Science Basis. Contribution of Working Group I to the Fourth Assessment Report of the Intergovernmental Panel on Climate Change. S. Solomon et al, Cambridge University Press. Cambridge, United Kingdom p 996). There is therefore a need in the art for the replacement of R-134a with a more environmentally acceptable alternative.

It is understood in the art that replacement heat transfer fluids must possess a mosaic of properties depending on the particular application. For many of the applications which involve the cooling or heat of air to which members of public are intended to be exposed, that mosaic will generally include excellent heat transfer properties, chemical stability, low or no toxicity, non-flammability and/or lubricant compatibility amongst others. The identification of a heat transfer fluid meeting all of these requirements is not trivial.

Non-flammability is considered to be an important, and in some cases, an essential property for many heat transfer applications Thus, it is frequently beneficial to use compounds in such compositions, which are non-flammable. As used herein, the term "non-flammable" refers to compounds or compositions which are determined to be non-flammable in accordance with ASTM standard E-681-2001 at conditions described in ASHRAE Standard 34-2013 and described in Appendix B1 to ASHRAE Standard 34-2013.

However, non-flammabillity is generally understood to be inversely correlated to low GWP. For example, while R-134a is classed as a non-flammable (i.e. class 1) refrigerant, it has a high GWP of about 1430. In contrast, while R152a (1,1-difluoroethane) has a GWP of about 124, it is classed as a flammable (i.e. a class 2) refrigerant. Thus, it is generally difficult to provide a refrigerant which is non-flammable, and which has a low GWP, that is, a GWP of not greater than about 150.

SUMMARY OF THE INVENTION

Figure 1A:
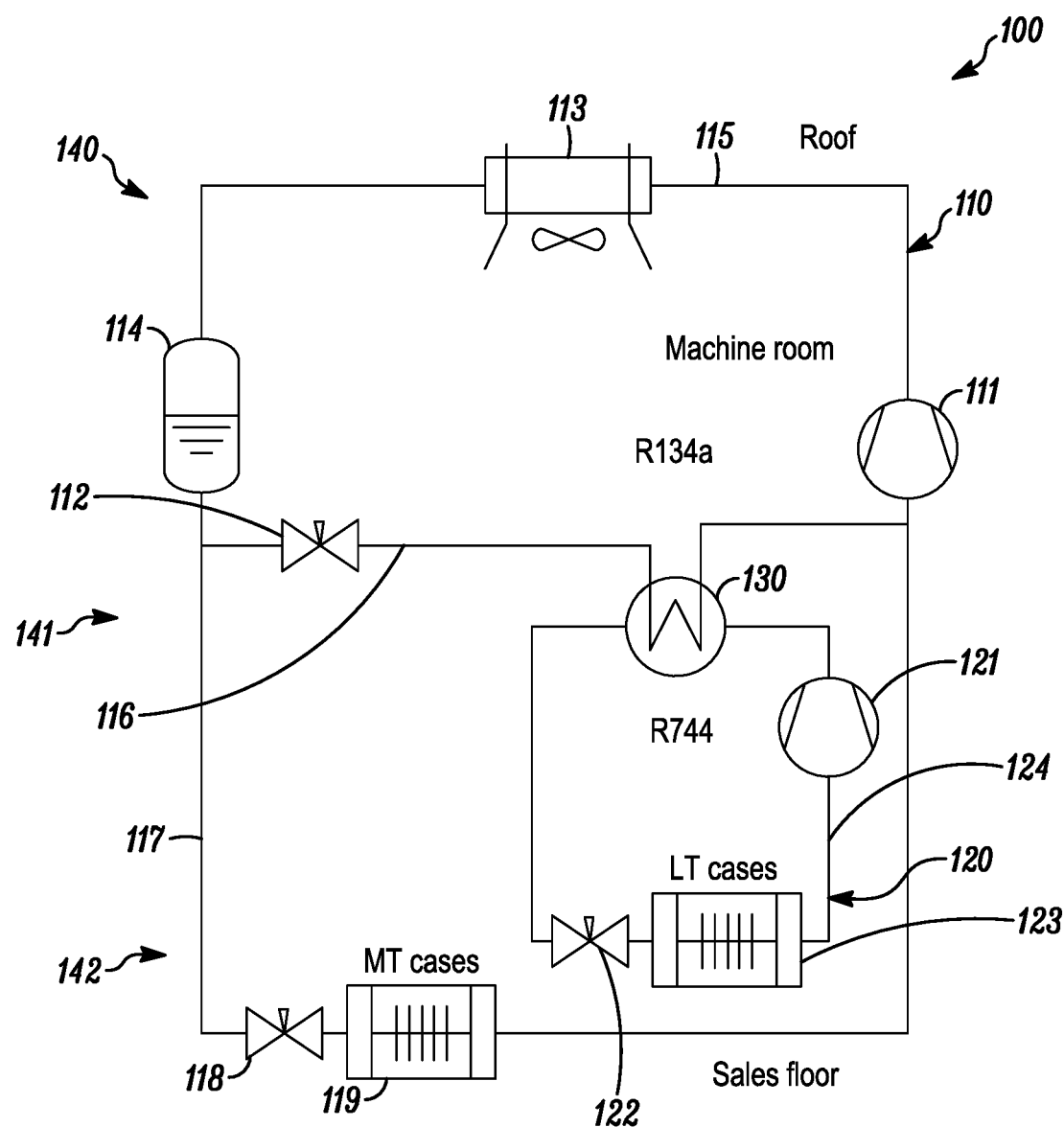
FIG. 1A shows an example of a previously used R-134a refrigeration system.

Applicants have found that the compositions of the present invention satisfy in an exceptional and unexpected way the need for alternatives and/or replacements and/or retrofits for refrigerants in such applications, particularly and preferably HFC-134a (also referred to herein as "R-134a") that at once have lower GWP values and provide non-flammable, non-toxic fluids that have a close match in cooling efficiency and capacity to R-134a in refrigeration applications in such systems.

The present invention includes refrigerants comprising at least about 97% by weight of the following three compounds, with each compound being present in the following relative percentages:

from 1% by weight to 2%+/−0.5% by weight trans-1-chloro-3,3,3-trifluoropropene (HFCO-1233zd(E)), from about 77% by weight to about 83% by weight trans-1,3,3,3-tetrafluoropropene (HFO-1234ze(E)), and from about 15% by weight to about 21% by weight trifluoroiodomethane ($CF_3I$).

Refrigerants as described in this paragraph are sometimes referred to for convenience as Refrigerant 1.

As used herein with respect to percentages based on a list of compounds or components, the term "relative percentages" means the percentage of the identified compounds or components based on the total weight of the listed components.

As used herein with respect to weight percentages, the term "about" in relation to the amounts expressed in weight percent means that the amount of the component can vary by an amount of +/−2% by weight. The amount of the component is preferably +/−1% by weight, more preferably +/−0.5% by weight, even more preferably +/−0.3% by weight, and most preferably +/−0.2% by weight. The refrigerants and compositions of the invention include in preferred embodiments amounts of an identified compound or component specified as being "about" wherein the amount is the identified amount +/−1% by weight, and even more preferably +/−0.5% by weight.

The present invention includes refrigerants comprising at least about 98.5% by weight of the following three compounds, with each compound being present in the following relative percentages:
from 1% by weight to 2%+/−0.5% by weight trans-1-chloro-3,3,3-trifluoropropene (HFCO-1233zd(E)),
from about 77% by weight to about 83% by weight trans-1,3,3,3-tetrafluoropropene (HFO-1234ze(E)), and
from about 15% by weight to about 21% by weight trifluoroiodomethane (CF$_3$I).
Refrigerants as described in this paragraph are sometimes referred to for convenience as Refrigerant 2.

The present invention includes refrigerants comprising at least about 99.5% by weight of the following three compounds, with each compound being present in the following relative percentages:
from 1% by weight to 2%+/−0.5% by weight trans-1-chloro-3,3,3-trifluoropropene (HFCO-1233zd(E)),
from about 77% by weight to about 83% by weight trans-1,3,3,3-tetrafluoropropene (HFO-1234ze(E)), and
from about 15% by weight to about 21% by weight trifluoroiodomethane (CF$_3$I).
Refrigerants as described in this paragraph are sometimes referred to for convenience as Refrigerant 3.

The present invention includes refrigerants consisting essentially of the following three compounds, with each compound being present in the following relative percentages:
from 1% by weight to 2%+/−0.5% by weight trans-1-chloro-3,3,3-trifluoropropene (HFCO-1233zd(E)),
from about 77% by weight to about 83% by weight trans-1,3,3,3-tetrafluoropropene (HFO-1234ze(E)), and
from about 15% by weight to about 21% by weight trifluoroiodomethane (CF$_3$I).
Refrigerants as described in this paragraph are sometimes referred to for convenience as Refrigerant 4.

The present invention includes refrigerants consisting of the following four compounds, with each compound being present in the following relative percentages:
from 1% by weight to 2%+/−0.5% by weight trans-1-chloro-3,3,3-trifluoropropene (HFCO-1233zd(E)),
from about 77% by weight to about 83% by weight trans-1,3,3,3-tetrafluoropropene (HFO-1234ze(E)), and
from about 15% by weight to about 21% by weight trifluoroiodomethane (CF$_3$I).
Refrigerants as described in this paragraph are sometimes referred to for convenience as Refrigerant 5.

The present invention includes refrigerants comprising at least about 97% by weight of the following three compounds, with each compound being present in the following relative percentages:
2%+/−0.5% by weight trans-1-chloro-3,3,3-trifluoropropene (HFCO-1233zd(E)),
about 78% by weight of trans-1,3,3,3-tetrafluoropropene (HFO-1234ze(E)), and
about 20% by weight trifluoroiodomethane (CF3I). Refrigerants as described in this paragraph are sometimes referred to for convenience as Refrigerant 6.

The present invention includes refrigerants comprising at least about 98.5% by weight of the following three compounds, with each compound being present in the following relative percentages:
2%+/−0.5% by weight trans-1-chloro-3,3,3-trifluoropropene (HFCO-1233zd(E)),
about 78% by weight of trans-1,3,3,3-tetrafluoropropene (HFO-1234ze(E)), and
about 20% by weight trifluoroiodomethane (CF3I). Refrigerants as described in this paragraph are sometimes referred to for convenience as Refrigerant 7.

The present invention includes refrigerants consisting essentially of the following three compounds, with each compound being present in the following relative percentages: 2%+/−0.5% by weight trans-1-chloro-3,3,3-trifluoropropene (HFCO-1233zd(E)), about 78% by weight of trans-1,3,3,3-tetrafluoropropene (HFO-1234ze(E)), and about 20% by weight trifluoroiodomethane (CF3I). Refrigerants as described in this paragraph are sometimes referred to for convenience as Refrigerant 8.

The present invention includes refrigerants consisting of the following three compounds, with each compound being present in the following relative percentages:
2%+/−0.5% by weight trans-1-chloro-3,3,3-trifluoropropene (HFCO-1233zd(E)),
about 78% by weight of trans-1,3,3,3-tetrafluoropropene (HFO-1234ze(E)), and
about 20% by weight trifluoroiodomethane (CF3I). Refrigerants as described in this paragraph are sometimes referred to for convenience as Refrigerant 9.

The present invention includes refrigerants comprising at least about 98.5% by weight of the following three compounds, with each compound being present in the following relative percentages:
2%+/−0.5% by weight trans-1-chloro-3,3,3-trifluoropropene (HFCO-1233zd(E)),
78%+/−0.5% by weight of trans-1,3,3,3-tetrafluoropropene (HFO-1234ze(E)), and
20%+/−0.5% by weight trifluoroiodomethane (CF3I). Refrigerants as described in this paragraph are sometimes referred to for convenience as Refrigerant 10.

The present invention includes refrigerants consisting essentially of the following three compounds, with each compound being present in the following relative percentages:
2%+/−0.5% by weight trans-1-chloro-3,3,3-trifluoropropene (HFCO-1233zd(E)),
78%+/−0.5% by weight of trans-1,3,3,3-tetrafluoropropene (HFO-1234ze(E)), and
20%+/−0.5% by weight trifluoroiodomethane (CF3I). Refrigerants as described in this paragraph are sometimes referred to for convenience as Refrigerant 11.

The present invention includes refrigerants consisting of the following three compounds, with each compound being present in the following relative percentages:

2%+/−0.5% by weight trans-1-chloro-3,3,3-trifluoropropene (HFCO-1233zd(E)),
78%+/−0.5% by weight of trans-1,3,3,3-tetrafluoropropene (HFO-1234ze(E)), and
20%+/−0.5% by weight trifluoroiodomethane (CF3I). Refrigerants as described in this paragraph are sometimes referred to for convenience as Refrigerant 12.

The present invention includes refrigerants comprising at least about 97% by weight of the following four compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane ($CF_3I$).
Refrigerants as described in this paragraph are sometimes referred to for convenience as Refrigerant 13.

The present invention includes refrigerants comprising at least about 98.5% by weight of the following three compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane (CF3I).
Refrigerants as described in this paragraph are sometimes referred to for convenience as Refrigerant 14.

The present invention includes refrigerants comprising at least about 99.5% by weight of the following three compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane ($CF_3I$).
Refrigerants as described in this paragraph are sometimes referred to for convenience as Refrigerant 15.

The present invention includes refrigerants consisting essentially of the following four compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane ($CF_3I$).
Refrigerants as described in this paragraph are sometimes referred to for convenience as Refrigerant 16.

The present invention includes refrigerants consisting of the following four compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane ($CF_3I$).
Refrigerants as described in this paragraph are sometimes referred to for convenience as Refrigerant 17.

The present invention includes refrigerants comprising at least about 98.5% by weight of the following four compounds, with each compound being present in the following relative percentages:
2%+/−0.5% by weight trans-1-chloro-3,3,3-trifluoropropene (HFCO-1233zd(E)),
about 84% by weight trans-1,3,3,3-tetrafluoropropene (HFO-1234ze(E)),
4.4%+/−0.5% by weight 1,1,1,2,3,3,3-heptafluoropropane (HFC-227ea), and
about 9.6% by weight trifluoroiodomethane (CF3I). Refrigerants as described in this paragraph are sometimes referred to for convenience as Refrigerant 18.

The present invention includes refrigerants consisting essentially of the following four compounds, with each compound being present in the following relative percentages:
2%+/−0.5% by weight trans-1-chloro-3,3,3-trifluoropropene (HFCO-1233zd(E)),
about 84% by weight trans-1,3,3,3-tetrafluoropropene (HFO-1234ze(E)),
4.4%+/−0.5% by weight 1,1,1,2,3,3,3-heptafluoropropane (HFC-227ea), and
about 9.6% by weight trifluoroiodomethane (CF3I). Refrigerants as described in this paragraph are sometimes referred to for convenience as Refrigerant 19.

The present invention includes refrigerants consisting of the following four compounds, with each compound being present in the following relative percentages:
2%+/−0.5% by weight trans-1-chloro-3,3,3-trifluoropropene (HFCO-1233zd(E)),
about 84% by weight trans-1,3,3,3-tetrafluoropropene (HFO-1234ze(E)),
4.4%+/−0.5% by weight 1,1,1,2,3,3,3-heptafluoropropane (HFC-227ea), and
about 9.6% by weight trifluoroiodomethane (CF3I). Refrigerants as described in this paragraph are sometimes referred to for convenience as Refrigerant 20.

The present invention includes refrigerants comprising at least about 98.5% by weight of the following four compounds, with each compound being present in the following relative percentages:
2%+/−0.5% by weight trans-1-chloro-3,3,3-trifluoropropene (HFCO-1233zd(E)), 84%+/−0.5% by weight trans-1,3,3,3-tetrafluoropropene (HFO-1234ze(E)),
4.4%+/−0.5% by weight 1,1,1,2,3,3,3-heptafluoropropane (HFC-227ea), and 9.6%+/−0.5% by weight trifluoroiodomethane (CF3I). Refrigerants as described in this paragraph are sometimes referred to for convenience as Refrigerant 21.

The present invention includes refrigerants consisting essentially of the following four compounds, with each compound being present in the following relative percentages:
2%+/−0.5% by weight trans-1-chloro-3,3,3-trifluoropropene (HFCO-1233zd(E)), 84%+/−0.5% by weight trans-1,3,3,3-tetrafluoropropene (HFO-1234ze(E)), 4.4%+/−0.5% by weight 1,1,1,2,3,3,3-heptafluoropropane (HFC-227ea), and 9.6%+/−0.5% by weight trifluoroiodomethane (CF3I). Refrigerants as described in this paragraph are sometimes referred to for convenience as Refrigerant 22.

The present invention includes refrigerants consisting of the following four compounds, with each compound being present in the following relative percentages:
2%+/−0.5% by weight trans-1-chloro-3,3,3-trifluoropropene (HFCO-1233zd(E)),
84%+/−0.5% by weight trans-1,3,3,3-tetrafluoropropene (HFO-1234ze(E)),
4.4%+/−0.5% by weight 1,1,1,2,3,3,3-heptafluoropropane (HFC-227ea), and
9.6%+/−0.5% by weight trifluoroiodomethane (CF3I). Refrigerants as described in this paragraph are sometimes referred to for convenience as Refrigerant 23.

The present invention also provides refrigerant compositions in which the refrigerant is non-flammable. As used herein, the term "non-flammable" refers to compounds or compositions which are determined to be non-flammable in accordance with ASTM standard E-681-2016 at conditions described in Appendix B1 to ASHRAE Standard 34-2016. In particular, the present invention provides each of the refrigerants as identified herein as Refrigerants 1-23 in which the refrigerant is non-flammable, and for the purposes of convenience, each such refrigerant is referred to herein as Refrigerant 1NF, Refrigerant 2NF, Refrigerant 3NF, (and through to) Refrigerant 23NF, respectively.

The present invention also provides refrigerant compositions in which the refrigerant has a Global Warming Potential (GWP) of 150 or less. In particular, the present invention provides each of the refrigerants as identified herein as Refrigerants 1-23 in which the refrigerant has a GWP of 150 or less, and for the purposes of convenience, each such refrigerant is referred to herein as Refrigerant 1GWP150, Refrigerant 2GWP150, Refrigerant 3GWP150, (and through to) Refrigerant 23GWP150, respectively.

The phrase "Global Warming Potential" (hereinafter "GWP") was developed to allow comparisons of the global warming impact of different gases. Specifically, it is a measure of how much energy the emission of one ton of a gas will absorb over a given period of time, relative to the emission of one ton of carbon dioxide. The larger the GWP, the more that a given gas warms the Earth compared to $CO_2$ over that time period. The time period usually used for GWP is 100 years. GWP provides a common measure, which allows analysts to add up emission estimates of different gases. See www.epa.gov.

The present invention also provides refrigerant compositions in which the refrigerant has a Global Warming Potential (GWP) of less than 150 and in which the refrigerant is non-flammable. In particular, the present invention provides each of the refrigerants as identified herein as Refrigerants 1-23 in which the refrigerant is non-flammable and has a GWP of less than 150, and for the purposes of convenience, each such refrigerant is referred to herein as Refrigerant 1NFGWP150, Refrigerant 2NFGWP150, Refrigerant 3NFGWP150, (and through to) Refrigerant 23NFGWP150, respectively.

The present invention also provides refrigerant compositions in which the refrigerant has a Global Warming Potential (GWP) of 5 or less. In particular, the present invention provides each of the refrigerants as identified herein as Refrigerants 1-12 in which the refrigerant has a GWP of 5 or less, and for the purposes of convenience, each such refrigerant is referred to herein as Refrigerant 1GWP5, Refrigerant 2GWP5, Refrigerant 3GWP5, (and through to) Refrigerant 12GWP5, respectively.

The present invention also provides refrigerant compositions in which the refrigerant is non-flammable and has a Global Warming Potential (GWP) of 5. In particular, the present invention provides each of the refrigerants as identified herein as Refrigerants 1-12 in which the refrigerant has a GWP of 5 or less and in which the refrigerant is non-flammable, and for the purposes of convenience, each such refrigerant is referred to herein as Refrigerant 1NFGWP5, Refrigerant 2NFGWP5, Refrigerant 3NFGWP5, (and through to) Refrigerant 12NFGWP5, respectively.

DETAILED DESCRIPTION OF THE INVENTION

The present invention relates to refrigerants, heat transfer compositions and heat transfer methods which include or utilize refrigerant comprising HFCO-1233zd(E), HFO-1234ze(E), trifluoroiodomethane (CF3I). Trifluoroiodomethane (CF3I) is readily available from a variety of commercial sources, including Matheson TriGas, Inc. HFCO-1233zd(E) and HFO-1234ze(E) are commercially available materials that can be obtained from Honeywell International, Inc.

Embodiments of the present invention include also refrigerants that include HFC-227ea, in addition to HFCO-1233zd(E), HFO-1234ze(E) and trifluoroiodomethane (CF3I). HFC-227ea is also a known commercially available material.

Refrigerants

Applicants have found that refrigerants of the present invention are capable of providing exceptionally advantageous properties including: heat transfer properties, chemical stability, low or no toxicity, non-flammability, near zero ozone depletion potential ("ODP"), and lubricant compatibility in combination with a low GWP. A particular advantage of the refrigerants of the present invention is that they are non-flammable when tested in accordance with the non-flammability test defined herein. It will be appreciated by the skilled person that the flammability of a refrigerant is an important characteristic for use in certain important heat transfer applications. Thus, it is a desire in the art to provide a refrigerant composition which can be used as a replacement for and/or as a retrofit for R-134a for refrigeration applications which has excellent heat transfer properties, chemical stability, low or no toxicity, near zero ODP, and lubricant compatibility and which maintains non-flammability in use. This requirement is met by the refrigerants of the present invention.

The Applicants have found that the compositions of the invention are capable of achieving a difficult to achieve combination of properties including particularly low GWP. Thus, the compositions of the invention preferably have a GWP of 150 or less, or 5 or less.

In addition, the compositions of the invention have a low ODP. Thus, the compositions of the invention have an ODP of not greater than 0.05, preferably not greater than 0.02, and more preferably about zero.

In addition, the compositions of the invention show acceptable toxicity and preferably have an Occupational Exposure Limit ("OEL") of greater than about 400. As used herein, the term "Occupational Exposure Limit (OEL)" is used in accordance with and has a value determined in accordance with ASHRAE Standard 34-2016 Designation and Safety Classification of Refrigerants.

Heat Transfer Compositions

Preferably, the invention includes heat transfer compositions comprising any one of the refrigerants of the present invention, including in particular each of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, in an amount of greater than 40% by weight of the heat transfer composition, or greater than about 50% by weight of the heat transfer composition, or greater than 70% by weight of the heat transfer composition, or greater than 80% by weight of the heat transfer composition or greater than 90% by weight of the heat transfer composition. The heat transfer composition may consist essentially of or consist of the refrigerant, including in particular each of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5.

The heat transfer compositions of the invention may include other components for the purpose of enhancing or providing certain functionality to the compositions. Such other components may include one or more of lubricants, dyes, solubilizing agents, compatibilizers, stabilizers, antioxidants, corrosion inhibitors, extreme pressure additives and anti wear additives.

In preferred embodiments the heat transfer compositions comprise any one of the refrigerants of the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5 and a stabilizer.

In preferred embodiments the heat transfer compositions consist essentially of any one of the refrigerants of the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5 and a stabilizer.

In preferred embodiments the heat transfer compositions comprise any one of the refrigerants of the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5 and a lubricant.

In preferred embodiments the heat transfer compositions consist essentially of any one of the refrigerants of the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5 and a lubricant.

In preferred embodiments the heat transfer compositions comprise any one of the refrigerants of the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, a stabilizer and a lubricant.

In preferred embodiments the heat transfer compositions consist essentially of any one of the refrigerants of the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, a stabilizer and a lubricant.

Stabilizers

Examples of useful stabilizers for use in the heat transfer compositions hereof include diene-based compounds and/or phenol-based compounds and/or phosphorus compounds and/or nitrogen compounds and/or epoxides. Examples of preferred stabilizers include diene-based compounds and/or phenol-based compounds and/or phosphorus compounds.

The stabilizer preferably is provided in the heat transfer composition in an amount of greater than 0 and preferably from 0.0001% by weight to about 5% by weight, preferably 0.01% by weight to about 2% by weight, and more preferably from 0.1 to about 1% by weight. In each case, percentage by weight refers to the weight of the heat transfer composition.

The diene-based compounds include C3 to C15 dienes and to compounds formed by reaction of any two or more C3 to C4 dienes. Preferably, the diene based compounds are selected from the group consisting of allyl ethers, propadiene, butadiene, isoprene, and terpenes. The diene-based compounds are preferably terpenes, which include but are not limited to terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin $A_1$. Preferably, the stabilizer is farnesene. Preferred terpene stabilizers are disclosed in U.S. Provisional Patent Application No. 60/638,003 filed on Dec. 12, 2004, published as US 2006/0167044A1, which is incorporated herein by reference.

In addition, the diene based compounds can be provided in the heat transfer composition in an amount greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

The diene based compounds are preferably provided in combination with a phosphorous compound.

The phenol can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, and preferably BHT.

The phenol compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, percentage by weight refers to the weight of the heat transfer composition.

The phosphorus compound can be a phosphite or a phosphate compound. For the purposes of this invention, the phosphite compound can be a diaryl, dialkyl, triaryl and/or trialkyl phosphite, and/or a mixed aryl/alkyl di- or tri-substituted phosphite, in particular one or more compounds selected from hindered phosphites, tris-(di-tert-butylphenyl) phosphite, di-n-octyl phosphite, iso-octyl diphenyl phosphite, iso-decyl diphenyl phosphite, tri-iso-decyl phosphate, triphenyl phosphite and diphenyl phosphite, particularly diphenyl phosphite.

The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, by weight refers to weight of the heat transfer composition.

When the stabilizer is a nitrogen compound, the stabilizer may comprise an amine based compound such as one or more secondary or tertiary amines selected from diphenylamine, p-phenylenediamine, triethylamine, tributylamine, diisopropylamine, triisopropylamine and triisobutylamine. The amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethyl-butyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin®765 (Ciba), BLS® 1944 (Mayzo Inc) and BLS® 1770 (Mayzo Inc). For the purposes of this invention, the amine based compound also can be an alkyldiphenyl amine such as bis (nonylphenyl amine), dialkylamine such as (N-(1-methylethyl)-2-propylamine, or one or more of phenyl-alpha-naphthyl amine (PANA), alkyl-phenyl-alpha-naphthyl-amine (APANA), and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

Alternatively, or in addition to the nitrogen compounds identified above, one or more compounds selected from dinitrobenzene, nitrobenzene, nitromethane, nitrosobenzene, and TEMPO [(2,2,6,6-tetramethylpiperidin-1-yl)oxyl] may be used as the stabilizer.

The nitrogen compounds can be provided in the heat transfer composition in an amount of greater than 0 and from 0.0001% by weight to about 5% by weight, preferably 0.001% by weight to about 2.5% by weight, and more preferably from 0.01% to about 1% by weight. In each case, percentage by weight refers to the weight of the heat transfer composition.

Useful epoxides include aromatic epoxides, alkyl epoxides, and alkyenyl epoxides.

The diene based compounds are preferably provided in combination with a phosphorous compound. Preferably, the heat transfer composition comprises a refrigerant as set out above and a stabilizer composition comprising farnesene and a phosphorous compound selected from a diaryl phosphite, a dialkyl phosphite, a triaryl phosphate or a trialkyl phosphate, more preferably diphenyl phosphite and/or tri-n-butyl phosphate. More preferably the heat transfer composition comprises a refrigerant as described herein and a stabilizer composition comprising farnesene and one or more of a diaryl phosphite or a dialkyl phosphite, more preferably diphenyl phosphite. Preferably the stabilizer comprises farnesene and diphenyl phosphite.

The heat transfer composition of the invention can preferably comprise Refrigerant 1 and a stabilizer composition comprising BHT, wherein said BHT is present in an amount of from about 0.0001% by weight to about 5% by weight based on the weight of heat transfer composition. BHT present in an amount of from about 0.0001% by weight to about 5% by weight based on the weight of heat transfer composition is sometimes referred to for convenience as Stabilizer 1.

The heat transfer composition of the invention can preferably comprise Refrigerant 2 and Stabilizer 1.

The heat transfer composition of the invention can preferably comprise Refrigerant 3 and Stabilizer 1.

The heat transfer composition of the invention can preferably comprise Refrigerant 4 and Stabilizer 1.

The heat transfer composition of the invention can preferably comprise Refrigerant 5 and Stabilizer 1.

The heat transfer composition of the invention can preferably comprise Refrigerant 6 and Stabilizer 1.

The heat transfer composition of the invention can preferably comprise Refrigerant 7 and Stabilizer 1.

The heat transfer composition of the invention can preferably comprise Refrigerant 8 and Stabilizer 1.

The heat transfer composition of the invention can preferably comprise Refrigerant 9 and Stabilizer 1.

The heat transfer composition of the invention can preferably comprise Refrigerant 10 and Stabilizer 1.

The heat transfer composition of the invention can preferably comprise Refrigerant 11 and Stabilizer 1.

The heat transfer composition of the invention can preferably comprise Refrigerant 12 and Stabilizer 1.

The heat transfer composition of the invention can preferably comprise Refrigerant 13 and Stabilizer 1.

The heat transfer composition of the invention can preferably comprise Refrigerant 14 and Stabilizer 1.

The heat transfer composition of the invention can preferably comprise Refrigerant 15 and Stabilizer 1.

The heat transfer composition of the invention can preferably comprise Refrigerant 16 and Stabilizer 1.

The heat transfer composition of the invention can preferably comprise Refrigerant 17 and Stabilizer 1.

The heat transfer composition of the invention can preferably comprise Refrigerant 18 and Stabilizer 1.

The heat transfer composition of the invention can preferably comprise Refrigerant 19 and Stabilizer 1.

The heat transfer composition of the invention can preferably comprise Refrigerant 20 and Stabilizer 1.

The heat transfer composition of the invention can preferably comprise Refrigerant 21 and Stabilizer 1.

The heat transfer composition of the invention can preferably comprise Refrigerant 22 and Stabilizer 1.

The heat transfer composition of the invention can preferably comprise Refrigerant 23 and Stabilizer 1.

The heat transfer composition of the invention can preferably comprise any of Refrigerants 1NF-23NF and Stabilizer 1.

The heat transfer composition of the invention can preferably comprise any of Refrigerants 1NFGWP150-23NFGWP150 and Stabilizer 1.

The heat transfer composition of the invention can preferably comprise any of Refrigerants 1GWP5-12GWP5 and Stabilizer 1.

The heat transfer composition of the invention can preferably comprise any of Refrigerants 1NFGWP5-12NFGWP5 and Stabilizer 1.

The heat transfer composition of the invention can preferably comprise Refrigerant 1 and a stabilizer composition comprising farnesene, diphenyl phosphite and BHT, wherein the farnesene is provided in an amount of from about 0.0001% by weight to about 5% by weight based on the weight of the heat transfer composition, the diphenyl phosphite is provided in an amount of from about 0.0001% by weight to about 5% by weight based on the weight of the heat transfer composition, and the BHT is provided in an amount of from about 0.0001% by weight to about 5% by weight based on the weight of heat transfer composition. A stabilizer composition comprising farnesene, diphenyl phosphite and BHT, wherein the farnesene is provided in an amount of from about 0.0001% by weight to about 5% by weight based on the weight of the heat transfer composition, the diphenyl phosphite is provided in an amount of from about 0.0001% by weight to about 5% by weight based on the weight of the heat transfer composition, and the BHT is provided in an amount of from about 0.0001% by weight to about 5% by weight based on the weight of heat transfer composition is sometimes referred to for convenience as Stabilizer 2.

The heat transfer composition of the invention can preferably comprise Refrigerant 2 and Stabilizer 2.

The heat transfer composition of the invention can preferably comprise Refrigerant 3 and Stabilizer 2.

The heat transfer composition of the invention can preferably comprise Refrigerant 4 and Stabilizer 2.

The heat transfer composition of the invention can preferably comprise Refrigerant 5 and Stabilizer 2.

The heat transfer composition of the invention can preferably comprise Refrigerant 6 and Stabilizer 2.

The heat transfer composition of the invention can preferably comprise Refrigerant 7 and Stabilizer 2.

The heat transfer composition of the invention can preferably comprise Refrigerant 8 and Stabilizer 2.

The heat transfer composition of the invention can preferably comprise Refrigerant 9 and Stabilizer 2.

The heat transfer composition of the invention can preferably comprise Refrigerant 10 and Stabilizer 2.

The heat transfer composition of the invention can preferably comprise Refrigerant 11 and Stabilizer 2.

The heat transfer composition of the invention can preferably comprise Refrigerant 12 and Stabilizer 2.

The heat transfer composition of the invention can preferably comprise Refrigerant 13 and Stabilizer 2.

The heat transfer composition of the invention can preferably comprise Refrigerant 14 and Stabilizer 2.

The heat transfer composition of the invention can preferably comprise Refrigerant 15 and Stabilizer 2.

The heat transfer composition of the invention can preferably comprise Refrigerant 16 and Stabilizer 2.

The heat transfer composition of the invention can preferably comprise Refrigerant 17 and Stabilizer 2.

The heat transfer composition of the invention can preferably comprise Refrigerant 18 and Stabilizer 2.

The heat transfer composition of the invention can preferably comprise Refrigerant 19 and Stabilizer 2.

The heat transfer composition of the invention can preferably comprise Refrigerant 20 and Stabilizer 2.

The heat transfer composition of the invention can preferably comprise Refrigerant 21 and Stabilizer 2.

The heat transfer composition of the invention can preferably comprise Refrigerant 22 and Stabilizer 2.

The heat transfer composition of the invention can preferably comprise Refrigerant 23 and Stabilizer 2.

The heat transfer composition of the invention can preferably comprise any of Refrigerants 1NF-23NF and Stabilizer 2.

The heat transfer composition of the invention can preferably comprise any of Refrigerants 1NFGWP150-23NFGWP150 and Stabilizer 2.

The heat transfer composition of the invention can preferably comprise any of Refrigerants 1GWP5-12GWP5 and Stabilizer 2.

The heat transfer composition of the invention can preferably comprise any of Refrigerants 1NFGWP5-12NFGWP5 and Stabilizer 2.

The heat transfer composition of the invention can more preferably comprise any one of the refrigerants of the invention as described herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, and a stabilizer composition comprising farnesene, diphenyl phosphite and BHT, wherein the farnesene is provided in an amount of from about 0.001% by weight to about 2.5% by weight based on the weight of the heat transfer composition, the diphenyl phosphite is provided in an amount of from about 0.001% by weight to about 2.5% by weight based on the weight of the heat transfer composition, and the BHT is provided in an amount of from about 0.001% by weight to about 2.5% by weight based on the weight of heat transfer composition.

The heat transfer composition of the invention can most preferably comprise any one of the inventive refrigerants, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, and a stabilizer composition comprising farnesene, diphenyl phosphite and BHT, wherein the farnesene is provided in an amount of from about 0.01% by weight to about 1% by weight based on the weight of the heat transfer composition, the diphenyl phosphite is provided in an amount of from about 0.01% by weight to about 1% by weight based on the weight of the heat transfer composition, and the BHT is provided in an amount of from about 0.01% by weight to about 1% by weight based on the weight of heat transfer composition.

Lubricants

Each of the heat transfer compositions of the invention as defined above may additionally comprise a lubricant. In general, the heat transfer composition comprises a lubricant, in amounts of from about 5 to 50% by weight of the heat transfer composition, preferably about 10 to about 50% by weight of the heat transfer composition, preferably from about 20 to about 50% by weight of the heat transfer composition, alternatively about 20 to about 40% by weight of the heat transfer composition, alternatively about 20 to about 30% by weight of the heat transfer composition, alternatively about 30 to about 50% by weight of the heat transfer composition, alternatively about 30 to about 40% by weight of the heat transfer composition. The heat transfer composition may comprise a lubricant, in amounts of from about 5 to about 10% by weight of the heat transfer composition, preferably around about 8% by weight of the heat transfer composition.

Commonly used refrigerant lubricants such as polyol esters (POEs), polyalkylene glycols (PAGs), silicone oils, mineral oil, alkylbenzenes (ABs), polyvinyl ethers (PVEs), and poly(alpha-olefin) (PAO) that are used in refrigeration systems may be used with the refrigerant compositions of the present invention.

Preferably the lubricants are selected from polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs), and polyvinyl ethers (PVE), particularly from polyol esters (POEs), mineral oil and alkylbenzenes (ABs), most preferably from polyol esters (POEs).

Commercially available mineral oils include Witco LP 250 (registered trademark) from Witco, Suniso 3GS from Witco and Calumet R015 from Calumet. Commercially available alkylbenzene lubricants include Zerol 150 (registered trademark) and Zerol 300 (registered trademark) from Shrieve Chemical. Other useful esters include phosphate esters, di-basic acid esters and fluoro esters.

The heat transfer composition of the invention may consist essentially of or consist of a refrigerant, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, a stabilizer composition and a lubricant as described herein.

A preferred heat transfer composition comprises Refrigerant 1 and from 10 to 50% by weight of a polyol ester (POE) lubricant, based on the weight of the heat transfer composition. Polyol ester (POE) lubricant from 10 to 50% by weight of the heat transfer composition is sometimes referred to for convenience as Lubricant 1.

A preferred heat transfer composition comprises Refrigerant 2 and Lubricant 1.

A preferred heat transfer composition comprises Refrigerant 3 and Lubricant 1.

A preferred heat transfer composition comprises Refrigerant 4 and Lubricant 1.

A preferred heat transfer composition comprises Refrigerant 5 and Lubricant 1.

A preferred heat transfer composition comprises Refrigerant 6 and Lubricant 1

A preferred heat transfer composition comprises Refrigerant 7 and Lubricant 1.

A preferred heat transfer composition comprises Refrigerant 8 and Lubricant 1.

A preferred heat transfer composition comprises Refrigerant 9 and Lubricant 1.

A preferred heat transfer composition comprises Refrigerant 10 and Lubricant 1.

A preferred heat transfer composition comprises Refrigerant 11 and Lubricant 1.

A preferred heat transfer composition comprises Refrigerant 12 and Lubricant 1.

A preferred heat transfer composition comprises Refrigerant 13 and Lubricant 1.

A preferred heat transfer composition comprises Refrigerant 14 and Lubricant 1.

A preferred heat transfer composition comprises Refrigerant 15 and Lubricant 1.

A preferred heat transfer composition comprises Refrigerant 16 and Lubricant 1.

A preferred heat transfer composition comprises Refrigerant 17 and Lubricant 1.

A preferred heat transfer composition comprises Refrigerant 18 and Lubricant 1.

A preferred heat transfer composition comprises Refrigerant 19 and Lubricant 1.

A preferred heat transfer composition comprises Refrigerant 20 and Lubricant 1.

A preferred heat transfer composition comprises Refrigerant 21 and Lubricant 1.

A preferred heat transfer composition comprises Refrigerant 22 and Lubricant 1.

A preferred heat transfer composition comprises Refrigerant 23 and Lubricant 1.

A preferred heat transfer composition comprises any of Refrigerants 1NF-23NF and Lubricant 1.

A preferred heat transfer composition comprises any of Refrigerants 1NFGWP150-23NFGWP150 and Lubricant 1.

A preferred heat transfer composition comprises any of Refrigerants 1GWP5-12GWP5 and Lubricant 1.

A preferred heat transfer composition comprises any of Refrigerants 1NFGWP5-12NFGWP5 and Lubricant 1.

The heat transfer composition of the invention can preferably comprise Refrigerant 1, Stabilizer 1, and Lubricant 1.

The heat transfer composition of the invention can preferably comprise Refrigerant 2, Stabilizer 1, and Lubricant 1.

The heat transfer composition of the invention can preferably comprise Refrigerant 3, Stabilizer 1, and Lubricant 1.

The heat transfer composition of the invention can preferably comprise Refrigerant 4, Stabilizer 1, and Lubricant 1.

The heat transfer composition of the invention can preferably comprise Refrigerant 5, Stabilizer 1, and Lubricant 1.

The heat transfer composition of the invention can preferably comprise Refrigerant 6, Stabilizer 1, and Lubricant 1.

The heat transfer composition of the invention can preferably comprise Refrigerant 7, Stabilizer 1, and Lubricant 1.

The heat transfer composition of the invention can preferably comprise Refrigerant 8, Stabilizer 1, and Lubricant 1.

The heat transfer composition of the invention can preferably comprise Refrigerant 9, Stabilizer 1, and Lubricant 1.

The heat transfer composition of the invention can preferably comprise Refrigerant 10, Stabilizer 1, and Lubricant 1.

The heat transfer composition of the invention can preferably comprise Refrigerant 11, Stabilizer 1, and Lubricant 1.

The heat transfer composition of the invention can preferably comprise Refrigerant 12, Stabilizer 1, and Lubricant 1.

The heat transfer composition of the invention can preferably comprise Refrigerant 13, Stabilizer 1, and Lubricant 1.

The heat transfer composition of the invention can preferably comprise Refrigerant 14, Stabilizer 1, and Lubricant 1.

The heat transfer composition of the invention can preferably comprise Refrigerant 15, Stabilizer 1, and Lubricant 1.

The heat transfer composition of the invention can preferably comprise Refrigerant 16, Stabilizer 1, and Lubricant 1.

The heat transfer composition of the invention can preferably comprise Refrigerant 17, Stabilizer 1, and Lubricant 1.

The heat transfer composition of the invention can preferably comprise Refrigerant 18, Stabilizer 1, and Lubricant 1.

The heat transfer composition of the invention can preferably comprise Refrigerant 19, Stabilizer 1, and Lubricant 1.

The heat transfer composition of the invention can preferably comprise Refrigerant 20, Stabilizer 1, and Lubricant 1.

The heat transfer composition of the invention can preferably comprise Refrigerant 21, Stabilizer 1, and Lubricant 1.

The heat transfer composition of the invention can preferably comprise Refrigerant 22, Stabilizer 1, and Lubricant 1.

The heat transfer composition of the invention can preferably comprise Refrigerant 23, Stabilizer 1, and Lubricant 1.

The heat transfer composition of the invention can preferably comprise any of Refrigerants 1NF-23NF, Stabilizer 1, and Lubricant 1.

The heat transfer composition of the invention can preferably comprise any of Refrigerants 1NFGWP150-23NFGWP150, Stabilizer 1, and Lubricant 1.

The heat transfer composition of the invention can preferably comprise any of Refrigerants 1GWP5-12GWP5, Stabilizer 1, and Lubricant 1.

The heat transfer composition of the invention can preferably comprise any of Refrigerants 1NFGWP5-12NFGWP5, Stabilizer 1, and Lubricant 1.

The heat transfer composition of the invention can preferably comprise Refrigerant 1, Stabilizer 2, and Lubricant 1.

The heat transfer composition of the invention can preferably comprise Refrigerant 2, Stabilizer 2, and Lubricant 1.

The heat transfer composition of the invention can preferably comprise Refrigerant 3, Stabilizer 2, and Lubricant 1.

The heat transfer composition of the invention can preferably comprise Refrigerant 4, Stabilizer 2, and Lubricant 1.

The heat transfer composition of the invention can preferably comprise Refrigerant 5, Stabilizer 1, and Lubricant 1.

The heat transfer composition of the invention can preferably comprise Refrigerant 6, Stabilizer 2, and Lubricant 1.

The heat transfer composition of the invention can preferably comprise Refrigerant 7, Stabilizer 2, and Lubricant 1.

The heat transfer composition of the invention can preferably comprise Refrigerant 8, Stabilizer 2, and Lubricant 1.

The heat transfer composition of the invention can preferably comprise Refrigerant 9, Stabilizer 2, and Lubricant 1.

The heat transfer composition of the invention can preferably comprise Refrigerant 10, Stabilizer 2, and Lubricant 1.

The heat transfer composition of the invention can preferably comprise Refrigerant 11, Stabilizer 2, and Lubricant 1.

The heat transfer composition of the invention can preferably comprise Refrigerant 12, Stabilizer 2, and Lubricant 1.

The heat transfer composition of the invention can preferably comprise Refrigerant 13, Stabilizer 2, and Lubricant 1.

The heat transfer composition of the invention can preferably comprise Refrigerant 14, Stabilizer 2, and Lubricant 1.

The heat transfer composition of the invention can preferably comprise Refrigerant 15, Stabilizer 2, and Lubricant 1.

The heat transfer composition of the invention can preferably comprise Refrigerant 16, Stabilizer 2, and Lubricant 1.

The heat transfer composition of the invention can preferably comprise Refrigerant 17, Stabilizer 2, and Lubricant 1.

The heat transfer composition of the invention can preferably comprise Refrigerant 18, Stabilizer 2, and Lubricant 1.

The heat transfer composition of the invention can preferably comprise Refrigerant 19, Stabilizer 2, and Lubricant 1.

The heat transfer composition of the invention can preferably comprise Refrigerant 20, Stabilizer 2, and Lubricant 1.

The heat transfer composition of the invention can preferably comprise Refrigerant 21, Stabilizer 2, and Lubricant 1.

The heat transfer composition of the invention can preferably comprise Refrigerant 22, Stabilizer 2, and Lubricant 1.

The heat transfer composition of the invention can preferably comprise Refrigerant 23, Stabilizer 2, and Lubricant 1.

The heat transfer composition of the invention can preferably comprise any of Refrigerants 1NF-23NF, Stabilizer 2, and Lubricant 1.

The heat transfer composition of the invention can preferably comprise any of Refrigerants 1NFGWP150-23NFGWP150, Stabilizer 2, and Lubricant 1.

The heat transfer composition of the invention can preferably comprise any of Refrigerants 1GWP5-12GWP5, Stabilizer 2, and Lubricant 1.

The heat transfer composition of the invention can preferably comprise any of Refrigerants 1NFGWP5-12NFGWP5, Stabilizer 2, and Lubricant 1.

Other additives not mentioned herein can also be included by those skilled in the art in view of the teaching contained herein without departing from the novel and basic features of the present invention.

Combinations of surfactants and solubilizing agents may also be added to the present compositions to aid oil solubility as disclosed in U.S. Pat. No. 6,516,837, the disclosure of which is incorporated by reference in its entirety.

In addition the refrigerants according to the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, and the heat transfer composition which contain such refrigerants, show acceptable toxicity and preferably have an Occupational Exposure Limit (OEL) of greater than about 400.

Heat Transfer Systems, Uses and Methods

The refrigerant (and the heat transfer composition containing the refrigerant) of the invention can be used in heating and cooling applications.

The compositions disclosed herein are provided for use in heat transfer applications, including, low temperature refrigeration, medium temperature refrigeration, vending machines, heat pumps (including heat pump water heaters), dehumidifiers, chillers, and refrigerators and freezers.

The compositions of the invention may be employed in systems which are used or are suitable for use with R-134a refrigerant, such as existing or new heat transfer systems.

Any reference to the heat transfer composition of the invention refers to each and any of the heat transfer compositions as described herein. Thus, for the following discussion of the uses or applications of the heat transfer compositions of the invention, the heat transfer composition may comprise or consist essentially of any of the refrigerants described herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, in combination with any of the stabilizers described herein, including Stabilizer 1 and Stabilizer 2, and any of the lubricants discussed herein, including Lubricant 1.

For the purposes of this invention, each and any of the heat transfer compositions as described herein can be used in a heat transfer system, such a low temperature refrigeration system, a medium temperature refrigeration system, a vending machine, a heat pump (including a heat pump water heater), dehumidifiers, a chiller, and a refrigerator and/or freezer. The heat transfer system according to the present invention can comprise a compressor, an evaporator, a condenser and an expansion device, in communication with each other.

Examples of commonly used compressors, for the purposes of this invention include reciprocating, rotary (including rolling piston and rotary vane), scroll, screw, and centrifugal compressors. Thus, the present invention provides each and any of the refrigerants and/or heat transfer compositions as described herein for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve, and an electronic expansion valve. Thus, the present invention provides each and any of the refrigerants and/or heat transfer compositions as described herein for use in a heat transfer system comprising a capillary tube, a fixed orifice, a thermal expansion valve, or an electronic expansion valve.

For the purposes of this invention, the evaporator and the condenser together form a heat exchanger, preferably selected from a finned tube heat exchanger, a microchannel heat exchanger, a shell and tube, a plate heat exchanger, and a tube-in-tube heat exchanger. Thus, the present invention provides each and any of the refrigerants and/or heat transfer compositions as described herein for use in a heat transfer system wherein the evaporator and condenser together form a finned tube heat exchanger, a microchannel heat exchanger, a shell and tube, a plate heat exchanger, or a tube-in-tube heat exchanger.

The present invention also provides heat transfer systems and methods which utilize sequestration materials to help reduce the negative impact that refrigerant and/or lubricant deterioration may have on system operation. With respected to sequestration materials, the systems of the present invention preferably include a sequestration material in contact with at least a portion of a refrigerant according to the present invention wherein the temperature of the sequestration material and/or the temperature of the refrigerant when in said contact are at a temperature that is preferably at least about 10° C.

For the purposes of the systems and methods of the invention as described in this application, the term "about" in relation to temperatures means that the stated temperature can vary by an amount of +/−5° C. It will be understood that for temperatures described as being "about" an indicated value, the present invention included embodiments in which the temperature is the stated temperature +/−2° C., and more preferably +/−1° C., most preferably +/−0.5° C.

Any and all of the refrigerants and any and all of the sequestration materials as described herein can be used in the systems of the present invention. In preferred embodiments, the systems of the present invention include a sequestration material in contact with at least a portion of a refrigerant according to the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5. Preferably the sequestration material comprises: (a) an anion exchange resin, (b) activated alumina adsorbents, (c) a moisture-removing molecular sieve, (d) a molecular sieve (preferably a zeolite) comprising copper, silver, lead or a combination thereof, and (e) a combination of above materials.

Examples of anion exchange resins that are commercially available and useful according to the present invention include Amberlyst A21, Amberlyst A22, and Dowex Marathon.

Examples of activated alumina that are commercially available and useful according to the present invention include F200 sold by BASF and CLR-204 sold by Honeywell.

Examples of moisture-removing molecular sieves that are commercially available and useful according to the present invention include sodium aluminosilicate molecular sieves have pore size types 3A, 4A, 5A, and 13X.

An example of a zeolite molecular sieve that is commercially available is IONSIV D7310-C with activated sites used to remove specific decomposition products.

As used in connection with the sequestration material, the term "in contact with at least a portion" is intended in its broad sense to include each of the sequestration materials and any combination of sequestration materials being in contact with the same or separate portions of the refrigerant in the system and is intended to include but not necessarily limited to embodiments in which each type or specific sequestration material is: (i) located physically together with each other type or specific material, if present; (ii) is located physically separate from each other type or specific material, if present, and (iii) combinations in which two or more materials are physically together and at least one sequestration material is physically separate from at least one other sequestration material.

The amount that the anion exchange resin is preferably present in system in an amount of from about 5% to about 60% by weight based on the total of amount of lubricant and anion exchange resin present in the system. Preferably, the anion exchange resin is present in an amount of from about 20% to about 50% by weight and most preferably in an amount of from about 20% to 30% by weight based on the total of amount of lubricant and anion exchange resin present in the system.

The amount of anion exchange resin described herein refers to the dry weight of the anion exchange resin.

The amount that the zeolite molecular sieve that is preferably present the system is from about 1% to about 30% by weight based on the total of amount of lubricant and zeolite molecular sieve present in the system. Preferably, the zeolite molecular sieve is preferably present in an amount of from about 10% to about 30% by weight based on the total of amount of lubricant and zeolite molecular sieve present in the system.

The moisture-removing the molecular sieve (e.g., sodium about 60% by weight relative to the amount of lubricant present and moisture-removing material in the system. Preferably, the molecular sieve may be present in an amount of 30% to 45% by weight based on the total of amount of lubricant and moisture-removing molecular sieve present in the system.

The amount that the activated alumina that is preferably present in system is from about 5% to about 60% by weight based on the total of amount of lubricant and activated alumina present in the system.

Cascaded Refrigeration

The present invention provides heat transfer systems, uses and methods that include cascaded refrigeration systems, with such system containing any of the refrigerants disclosed herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, and any heat transfer composition as disclosed herein. Any of the equipment described herein generally with respect to use in heat transfer systems is adaptable for use in any of the cascade systems as described herein.

A cascade system typically has at least two stages, which are usually referred to as the "high stage" and the "low stage". A generalized flow diagram for a cascade heat transfer system is provided in FIG. 4 hereof. The heat transfer compositions of the invention are particularly provided for the high stage of the cascade system. In a cascade system, the high stage cycle generally has an air-to-refrigerant condenser and a refrigerant-to-refrigerant evaporator. The high stage typically has a positive displacement compressor which may be a reciprocating or rotary compressor, and a thermal or electronic expansion valve. The refrigerant evaporating temperature of the high stage is preferably in the range of about −10 to about 20° C. The condensing temperature of the high stage is preferably in the range of about 40 to about 70° C.

The low stage of the preferred cascade system generally (identified as Inter. HX in FIG. 4) has a refrigerant-to-refrigerant condenser and a refrigerant-to-air evaporator to cool the product. The low stage typically has a positive displacement compressor which may be a reciprocating or rotary compressor, and a thermal or electronic expansion valve. The refrigerant evaporating temperature of the low stage is preferably in the range of about −40 to about −10° C. The condensing temperature of the low stage is preferably in the range of about 0 to about 30° C. The low stage refrigerant may be, for example, carbon dioxide.

The present invention thus includes cascaded systems and methods in which any of the refrigerants described herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is used as a replacement for or a retrofit for R-134a in cascade refrigeration system.

Figure 1B:
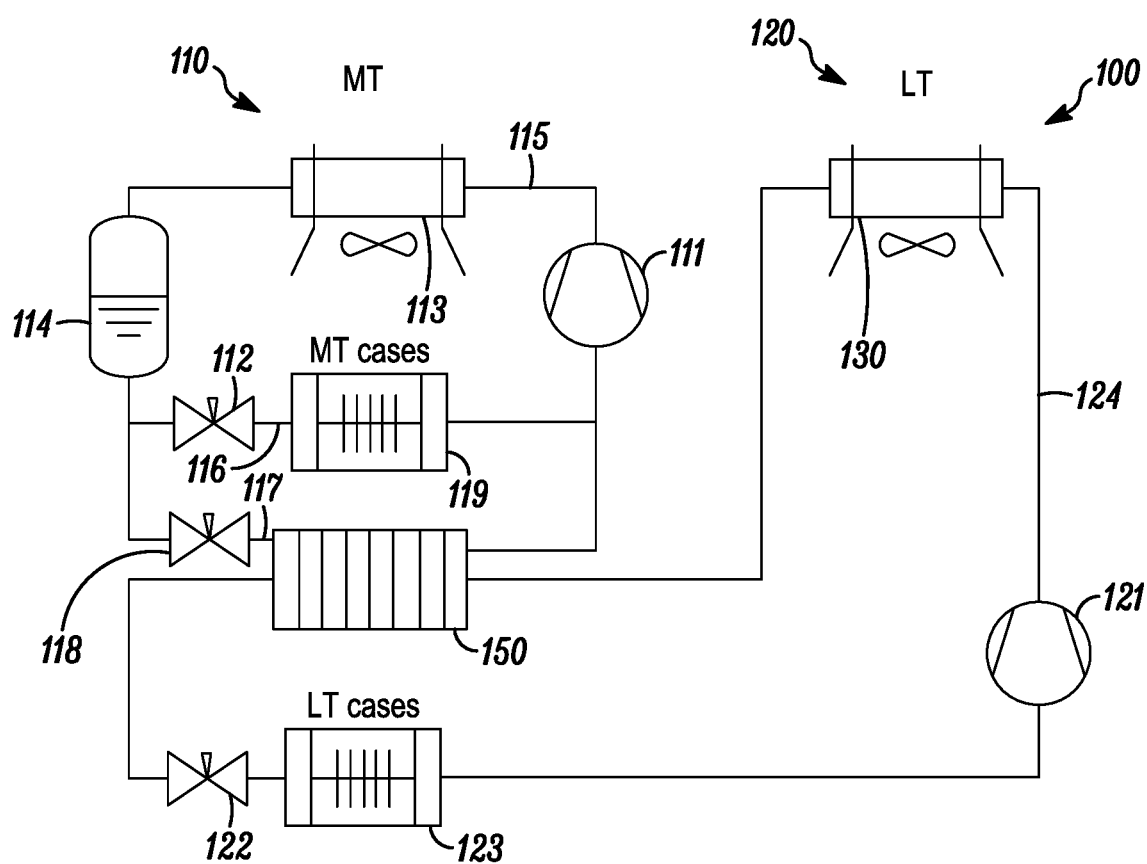
FIG. 1B shows an example of a R-134a refrigeration system that is the basis for the comparative examples described herein.

For the purpose of illustration, two cascade systems of know configuration are illustrated herein in FIG. 1A and FIG. 1B, and each cascade system of this type, and all know variations of such systems, are improved by the use of any one of the refrigerants of the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, and any of the heat transfer compositions which include any one of such refrigerants. For the purposes of convenience, such cascade systems are referred to herein as Cascade System 1A and Cascade System 1B, respectively, and each is described in detail below, Cascade System 1A One example of a cascade system of a general type that has used R-134a is illustrated in FIG. 1A hereof as system 100, which is a refrigeration system of the type commonly used for commercial refrigeration in supermarkets. The system 100 is a direct expansion system which provides both medium and low temperature refrigeration via medium temperature refrigeration circuit 110 and low temperature refrigeration circuit 120. Medium temperature refrigeration is typically provided at an evaporation temperature level of about −10° C.

The level and type of cascade refrigeration disclosed herein in connection with Cascade System 1A is commonly used for products such as dairy, deli and fresh food. The individual temperature level for the different products is adjusted based on the product requirements. Low temperature refrigeration is typically provided at an evaporation temperature level of about −25° C. This level of refrigeration is commonly used for products such as ice cream and frozen goods. Again, the individual temperature level for the different products is adjusted based on the product requirements. In preferred embodiments, the low system evaporation temperatures is −25° C., +/−3° C. or +/−2° C. In such systems a medium temperature refrigeration circuit 110 has or would be designed to have, or would be useful with R134a as its refrigerant, and according to preferred embodiments of the present invention any of the refrigerants and/or heat transfer compositions are used in such a system in place of, or a replacement for, or as a retrofit for R-134a. Such a cascade refrigeration system of the general type illustrated in FIG. 1A is referred to herein for convenience as Cascade System 1A.

In Cascade System 1A the medium temperature refrigeration circuit 110 preferably provides both the medium temperature cooling and removes the rejected heat from the lower temperature refrigeration circuit 120 via a heat exchanger 130. The medium temperature refrigeration circuit 110 extends between, for example, a roof 140, a machine room 141 and a sales floor 142. The low temperature refrigeration circuit 120 on the other hand has an alternative refrigerant, for example R744, as its refrigerant. The low temperature refrigeration circuit 120 extends between the machine room 141 and the sales floor 142. Usefully, as discussed above, R744 has a low GWP.

Since prior systems according to Cascade System 1A have been designed for use with and have been used with R134a as the second refrigerant (i.e., in the medium temperature circuit), the present invention includes using any of the refrigerants as disclosed herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, as the second refrigerant.

Cascade System 1B

FIG. 1B shows an example of a cascade refrigeration system 100 comprising a medium temperature refrigeration circuit 110 and a low temperature refrigeration circuit 120. To the extent systems of the type described in Cascade System 1A have elements and features in common with Cascade System 1B, the description of those elements or features in connection with Cascade System 1A applies to Cascade System 1B.

The low temperature refrigeration circuit 120 as illustrated in FIG. 1B has a compressor 121, an interface with a heat exchanger 130 for rejecting heat to ambient conditions, an expansion valve 122 and an evaporator 123. The low temperature refrigeration circuit 120 interfaces with the medium temperature refrigeration circuit 110 through the inter-circuit heat exchanger 150, which serves to reject heat to from the low temperature refrigerant to the medium temperature refrigerant, which may be any refrigerant according to the present invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, and thereby produce a subcooled refrigerant liquid in the low temperature refrigerant cycle. The evaporator 123 is interfaced with a space to be chilled, such as the inside of a freezer compartment. The components of the low temperature refrigeration circuit are connected in the order: evaporator 123, compressor 121, heat exchanger 130, inter-circuit heat exchanger 150, and expansion valve 122. The components are connected together via pipes 124 filled with a low temperature refrigerant.

Since prior systems according to Cascade System 1B have been designed for use with and used with R134a as the second refrigerant (i.e., in the medium temperature circuit), the present invention includes using any of the refrigerants as disclosed herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, as the second refrigerant.

The operation of each of Cascade System 1A and 1B will be described in more detail, especially with respect to features and elements that apply to each system, and in this connection features and elements that are similar in each system are labelled in each figure with the same numeral. The system 100 can in preferred embodiments span multiple areas, for example, the following three areas of a building: a roof where the condensers 113 and 130 are located; a machine room where the compressors 111, 112, heat exchanger 150, receiving tank 114 and expansion device 118 are located; and a sales floor 142 where the LT case, the MT case, and each of their expansion devices are located.

The low temperature refrigeration circuit 120 and the medium temperature refrigeration circuit thus each extend between the sales floor, the machine room and the roof. In use, the medium temperature circuit 110 provides medium temperature chilling to spaces to be chilled via the evaporator 119 and the low temperature circuit 120 provides low temperature chilling to spaces to be chilled via the evaporator 123. The medium temperature circuit 110 also removes heat from the liquid condensate from the low temperature condenser 120, thus providing subcooling to the liquid entering the evaporator 123.

The individual and overall functionality of the various components of the medium temperature refrigeration circuit 110 will now be described. Starting with heat exchanger 150, as described above the medium temperature refrigerant absorbs heat from the low temperature refrigerant via the heat exchanger 150. This absorption of heat causes the refrigerant in the medium temperature circuit 150, which is a low temperature gas and/or a mixture of gas and liquid on entering the heat exchanger 150, to be change liquid to the gas phase and/or to increase the temperature of the gas in the case where superheating will be produced. On leaving the heat exchanger 150, the gaseous refrigerant is sucked into the compressor 111 (along with the refrigerant from the evaporator 119) and is compressed by the compressor 111 to a high temperature and high pressure gas. This gas is released into the pipes 115 and travels to the condenser 113 which, in this example, is arranged on a roof of a building. In the condenser 113, the gaseous medium temperature refrigerant releases heat to the outside ambient air and so is cooled and condenses to a liquid. After the condenser 113, the liquid refrigerant collects in a fluid receiver 114. In this example, the fluid receiver 114 is a tank. On leaving the fluid receiver 114, the liquid refrigerant is manifolded to parallel connected medium temperature branch 116 and subcooling cooling branch 117. In the medium temperature branch 116, the liquid refrigerant flows to the expansion valve 112 which is used to lower the pressure and therefore temperature of the liquid refrigerant. The relatively cold liquid refrigerant then enters the heat exchanger 119 where it absorbs heat from the space to be chilled which is interfaced with the evaporator 119f. In the subcooling branch 117, the liquid refrigerant similarly flows first to an expansion valve 118 where the pressure and temperature of the refrigerant is lowered. After the valve 118, the refrigerant flows to the inter-circuit heat exchanger 150, as described above. From there, the gaseous refrigerant from the heat exchanger is sucked by the compressor 111 to the compressor 111 where it re-joins the refrigerant from the medium temperature cooling branch 116.

Although not mentioned above, it will be clear that to function as intended, the temperature of the refrigerant in the medium temperature circuit 110 as it enters the heat exchanger 150 must be less than the temperature of the refrigerant in the low temperature circuit 120 as it enters the heat exchanger 150. If this were not the case, the medium temperature circuit 110 would not provide the desired subcooling to the low temperature refrigerant in circuit 120.

Cascade Systems 2 and 3

Figure 2:
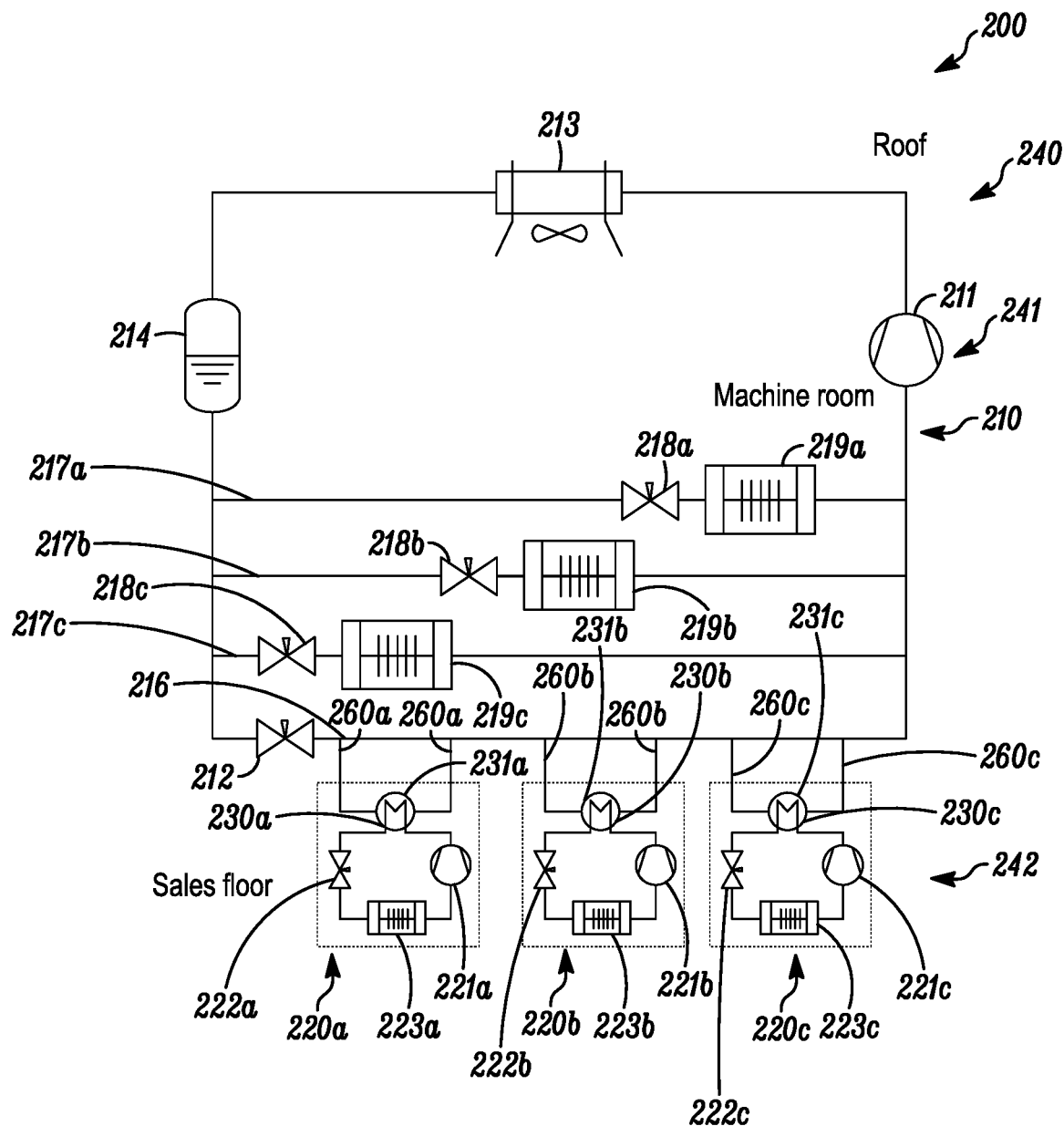
FIG. 2 shows a cascaded refrigeration system according to preferred embodiments of the invention.
Figure 3:
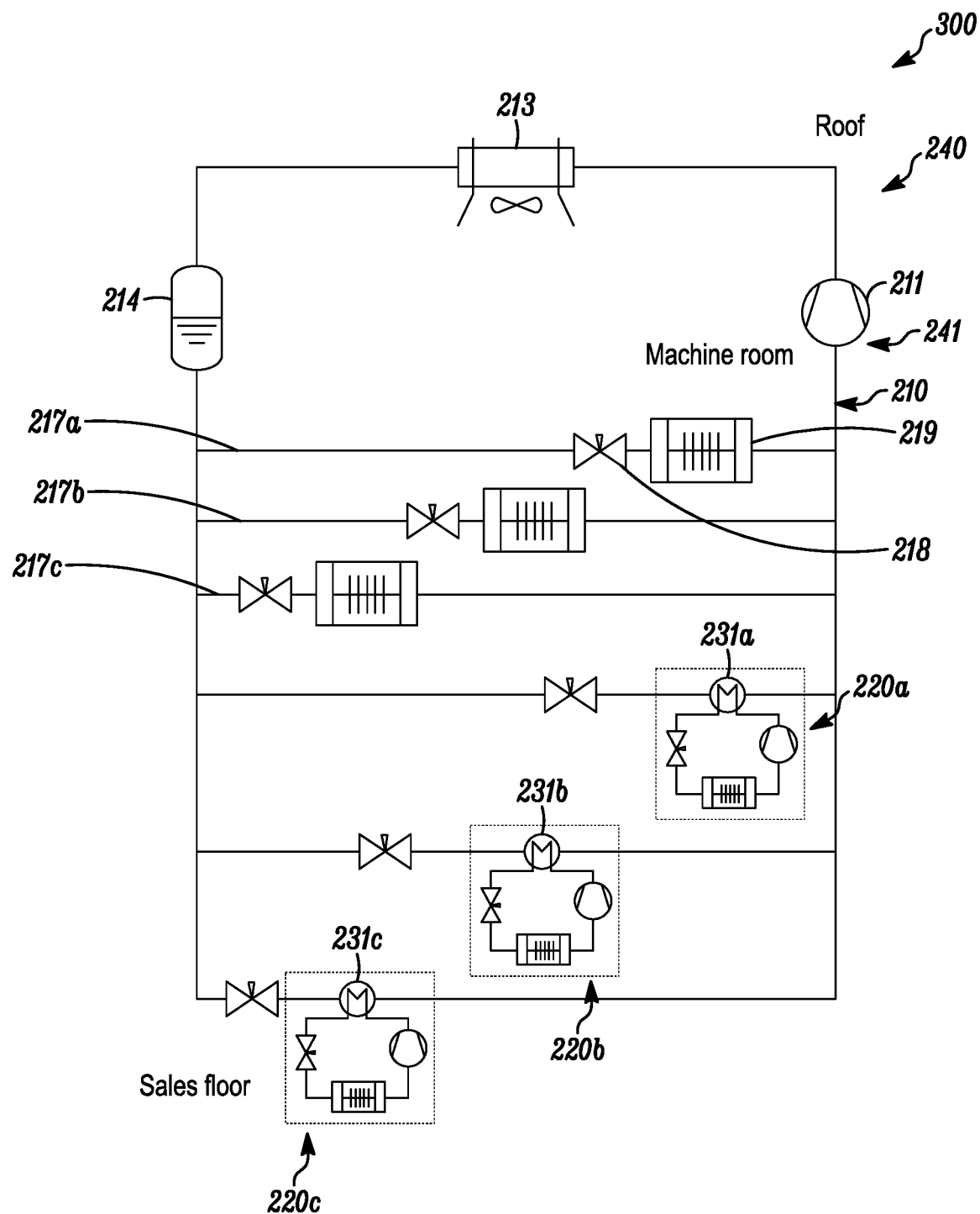
FIG. 3 shows an alternative cascaded refrigeration system according to preferred embodiments of the invention.

In addition to use of the present refrigerants as replacements for R-134a in known R-134a systems, applicants have developed inventive cascade refrigerations systems and each of the refrigerants described herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, can be used in these inventive systems, and in particular as the refrigerant in the higher temperature stage circuit. These two embodiments are illustrated in FIGS. 2 and 3 herein and are explained in detail below.

The cascade system according to preferred embodiments preferably comprises: one or more first refrigeration units, each refrigeration unit containing a first refrigeration circuit, each first refrigeration circuit comprising an evaporator and a heat exchanger; and a second refrigeration circuit; wherein each heat exchanger is arranged to transfer heat energy between its respective first refrigeration circuit and the second refrigeration circuit. The second circuit may be located substantially completely outside of said plurality of first refrigeration units. As used herein, the term "substantially completely outside of said plurality of first refrigeration units" means that the components of the second refrigeration circuit are not within said first refrigeration units except that transport piping and the like which may be considered part of the second refrigeration circuit can pass into the first refrigeration units in order to provide heat exchange between the refrigerant of the first and second refrigeration circuits. As used herein, the term "first refrigeration unit" means an at least partially closed or closable structure that is capable of providing cooling within at least a portion of that structure and which is structurally distinct from any structure enclosing or containing said second refrigeration circuit in its entirety. According to and consistent with such meanings, the first refrigeration circuits of the present invention are sometimes referred to herein as "self-contained" when contained within such first refrigeration units, in accordance with the meanings described herein.

Each refrigeration unit may be arranged within a first area. The first area may be a shop floor. This means that each first refrigeration circuit may also be located within a first area, such as a shop floor.

Each refrigeration unit may comprise a space and/or objects contained within a space to be chilled, and preferably that space is within the refrigeration unit. Each evaporator may be arranged to chill its respective space/objects, preferably by cooling air within the space to be chilled.

As mentioned above, the second refrigeration circuit may have components thereof that extend between the first refrigeration unit and a second area. The second area may be, for example, a machine room which houses a substantial portion of the components of the second refrigeration circuit.

The second refrigeration circuit may extend to a second and a third area. For The third area may be an area outside of the building or buildings in which the first refrigeration units and the second area(s) are located. This allows for ambient cooling to be exploited.

Each first refrigeration circuit may comprise at least one fluid expansion device. The at least one fluid expansion device may be a capillary tube or an orifice tube. This is enabled by the conditions imposed on each first refrigeration circuit by its respective refrigeration unit being relatively constant. This means that simpler flow control devices, such as capillary and orifice tubes, can be and preferably are used to advantage in the first refrigeration circuits.

The average temperature of each of the first refrigeration circuits may be lower than the average temperature of the second refrigeration circuit. This is because the second refrigeration circuit may be used to provide cooling, that is, remove heat from, the first refrigeration circuits; and each first refrigeration circuit may cool a space to be chilled in its respective refrigeration unit.

The second refrigeration circuit may cool, that is, remove heat from, each of the first refrigeration circuits.

Each heat exchanger may be arranged to transfer heat energy between its respective first refrigeration circuit and the second refrigeration circuit at a respective circuit interface location.

Each of the circuit interface locations may be coupled in series-parallel combination with each other of the circuit interface locations. Usefully, this means that if one of the circuit interface locations, first refrigeration circuits, or first refrigeration units has a fault or blockage detected, the location, circuit or unit at fault can be isolated and/or bypassed by the second refrigeration circuit so that faults do not propagate through the system.

Each of the circuit interface locations may be coupled in series with at least one other circuit interface location.

Each of the circuit interface locations may be coupled in series with each other of the circuit interface locations.

Each of the circuit interface locations may be coupled in parallel with at least one other circuit interface location.

Each of the circuit interface locations may be coupled in parallel with each other of the circuit interface locations.

In each preferred embodiment disclosed herein, the second refrigerant is any refrigerant, including as described herein and/or any heat transfer composition as described herein, in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5. Since the preferred refrigerants of the present invention are both low GWP and non-flammable, the use of them is such systems is highly advantageous since the second refrigerant circuit may span numerous areas, and so having a non-flammable refrigerant is important for reducing the severity of potential leaks.

The second refrigeration circuit may comprise a second evaporator. The second evaporator may be coupled in parallel with the circuit interface locations.

The first refrigerant, which is used in the first refrigerant circuits, may comprise any of R744, hydrocarbons, R1234yf, R1234ze(E), R455A and combinations of these. Hydrocarbons may comprise any of R290, R600a or R1270. These refrigerants are low GWP.

The first refrigerant may be one of R744, hydrocarbons, R1234yf, R1234ze(E), R455A and combinations of these.

The system as illustrated in each of FIGS. 2 and 3 has a number of refrigeration units and each of the refrigeration units has at least one dedicated refrigeration circuit arranged within it. That is, each refrigeration unit contains at least one refrigeration circuit.

The refrigeration circuit contained within a refrigeration unit may comprise at least a heat exchanger that removes heat to the refrigerant in the circuit, and an evaporator that adds heat to the refrigerant.

The refrigeration circuit contained within a refrigeration unit may comprise a compressor, at least a heat exchanger that removes heat from the refrigerant in the circuit (preferably by removing heat from the refrigerant vapor exiting the compressor), and an evaporator that adds heat to the refrigerant (preferably by cooling the area of the refrigeration unit being chilled). Although it is contemplated that the size of the compressor used in the first refrigeration circuit, in generally the compressor may be a small size compressor. As used herein, the term "small size compressor" means the compressor has a power rating of not greater than about 1 horsepower. The compressor size may be from 0.1 horsepower to about 1 horsepower. The compressor size may be from 0.1 horsepower to about 0.75 horsepower. The compressor size may be from 0.1 horsepower to about 0.5 horsepower.

A refrigeration unit may be an integrated physical entity, i.e. an entity which is not designed to be dismantled into component parts. A refrigeration unit might be a fridge or a freezer, for example.

The refrigeration circuits provided within each refrigeration unit may themselves be cooled by a common refrigeration circuit at least partially external to the refrigeration units. In contrast to the dedicated refrigeration circuits contained within each refrigeration unit, common refrigeration circuits (which are generally referred to herein as second and third refrigeration circuits) may be extended circuits which extend between multiple areas of the building housing the units: such as between a sales floor (where the refrigeration units are arranged) and a machine room and/or a roof or outside area. Each refrigeration unit may comprise at least one compartment for storing goods, such as perishable goods. The compartments may define a space to be chilled by a refrigeration circuit contained within the refrigeration unit.

Any of the refrigerants described herein, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, may be used as the refrigerant in the second refrigeration circuits in any one of the cascade refrigeration systems described herein, including each of Cascade Systems 2 and 3, as described herein.

Cascade System 2

A cascade refrigeration system useful with the refrigerants of the present invention is described below in connection with FIG. 2. For the purposes of convenience such cascade refrigeration systems are referred to herein as Cascade System 2, and of the refrigerants as disclosed herein, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, may be used in any Cascade System 2 as the refrigerant in the second refrigeration circuit (i.e., in the medium temperature refrigeration circuit).

FIG. 2 shows a refrigeration system 200 which has, for example, three first refrigeration circuits 220a, 220b, 220c. Each of the first refrigeration circuits 220a, 220b, 220c has an evaporator 223, a compressor 221, a heat exchanger 230 and an expansion valve 222. In each circuit 220a, 220b, 220c, the evaporator 223, the compressor 221, the heat exchanger 230 and the expansion valve 222 are connected in series with one another in the order listed. Each of the first refrigeration circuits 220a, 220b, 220c is included within a separate respective refrigeration unit (not shown). In this example, each of the three illustrated refrigeration units is a freezer unit and the freezer unit houses its respective first refrigeration circuit. In this way, each refrigeration unit comprises a self-contained and dedicated refrigeration circuit. The refrigeration units (not shown), and therefore the first refrigeration circuits 220a, 220b, 220c, are arranged on a sales floor 242 of a supermarket.

In this example, the refrigerant in each of the first refrigeration circuits 220a, 220b, 220c is a low GWP refrigerant such as R744, hydrocarbons (R290, R600a, R1270), R1234yf, R1234ze(E) or R455A. As the skilled person will appreciate, the refrigerants in each of the first refrigeration circuits 220a, 220b, 220c may the same or different to the refrigerants in each other of the first refrigeration circuits 220a, 220b, 220c.

The refrigeration system 200 also has a second refrigeration circuit 210. The second refrigeration circuit 210 has a compressor 211, a condenser 213 and a fluid receiver 214. The compressor 211, the condenser 213 and the fluid receiver 214 are connected in series and in the order given. The second refrigeration circuit 210 also has four parallel connected branches: three medium temperature cooling branches 217a, 217b, 217c; and one low temperature cooling branch 216. The four parallel connected branches 217a, 217b, 217c and 216 are connected between the fluid receiver 214 and the compressor 211. Each of the medium temperature cooling branches 217a, 217b, 217c has an expansion valve 218 and an evaporator 219, 219b and 219c, respectively. The expansion valve 218 and evaporator 219 are connected in series and in the order given between the fluid receiver 214 and the condenser 211. The low temperature cooling branch 216 has an expansion valve 212 and an interface, in the form of inlet and outlet piping, conduits, valves and the like (represented collectively as 260a, 260b and 260c, respectively) which bring the second refrigerant to and from each of the heat exchangers 230a, 230b, 230c of the first refrigeration circuits 220a, 220b, 220c. The low temperature cooling branch 216 interfaces each of the heat exchangers 230a, 230b, 230c of the first refrigeration circuits 220a, 220b, 220c at a respective circuit interface location 231a, 231b, 231c. Each circuit interface location 231a, 231b, 231c is arranged in series-parallel combination with each other of the circuit interface locations 231a, 231b, 231c.

The medium temperature refrigeration circuit 210 has components which extend between the sales floor 242, a machine room 241 and a roof 140. The low temperature cooling branch 216 and the medium temperature cooling branches 217a, 217b, 217c of the medium temperature refrigeration circuit 210 are located on the sales floor 242. The compressor 211 and the fluid receiver 214 are located in the machine room 241. The condenser 213 is located where it can be readily exposed to ambient conditions, such as on the roof 240.

In use:
each of the first refrigeration circuits 220a, 220b, 220c absorbs heat via their evaporators 223 to provide low temperature cooling to a space to be chilled (not shown);
the second refrigeration circuit 210 absorbs heat from each of the heat exchangers 230a, 230b, 230c to cool the first refrigeration circuits 220a, 220b, 220c;
the second refrigeration circuit 210 absorbs heat at each of the evaporators 219 to provide medium temperature cooling to spaces to be chilled (not shown); and
the refrigerant in the second refrigeration circuit 210 is chilled in the chiller 213.

A number of beneficial results can be achieved using the arrangement shown in FIG. 2, particularly from each first refrigeration circuit 230 being self-contained in a respective refrigeration unit.

For example, installation and uninstallation of the refrigeration units and the overall cascaded refrigeration system 200 is simplified. This is because the refrigeration units, with their built-in, self-contained first refrigeration circuits 220a, 220b, 220c, can be easily connected or disconnected with the second refrigeration circuit 210, with no modification to the first refrigeration circuit 220, 220b, 220c required. In other words, the refrigeration units may simply be 'plugged' in to, or out of, the second refrigeration circuit 210.

Another advantage is that each refrigeration unit, including its respective first refrigeration circuit 220a, 220b, 220c, can be factory tested for defaults before being installed into a live refrigeration system 200. This mitigates the likelihood of faults, which can include leaks of potentially harmful refrigerants. Accordingly, reduced leak rate can be achieved.

Another advantage is that the lengths of the first refrigeration circuits 220a, 220b, 220c can be reduced since each circuit 220a, 220b, 220c is arranged in its respective refrigeration unit, and does not extend between a series of units. The reduced circuit length can result in improved efficiency as there is reduced heat infiltration in shorter lines due to reduced surface area. Further, reduced circuit length can also result in reduced pressure drop, which improves the system 200 efficiency.

The reduced circuit length, and the provision of the circuits self-contained within respective refrigeration units, also provides the ability to use more flammable refrigerants, such as R744, Hydrocarbons (R290, R600a, R1270), R1234yf, R1234ze(E) or R455A, in the first (low temperature) circuit which applicants have come to appreciate is a highly beneficial result. This is because both the likelihood of the refrigerant leaking is reduced (as discussed above) and because, even if the refrigerant were to leak, the leak would be contained to the relatively small area and containable area of the respective refrigeration unit, and because of the small size of the units, only a relatively small amount of refrigerant charge is used. In addition, this arrangement would permit the use of relatively low cost flame mitigation contingency procedures and/or devices since the area containing potentially flammable materials is much smaller, confined and uniform. Such more flammable refrigerants can have lower global warming potential (GWP). Advantageously therefore, governmental and societal targets for the use of low GWP refrigerants may be met and potentially even exceeded without compromising on safety of the system.

Another advantage is that each first refrigeration circuit 220a, 220b, 220c may only cool their respective refrigeration unit. This means that the load on each first refrigeration circuit 220a, 220b, 220c may remain relatively constant. That is, constant conditions are applied to the condensing 231 and evaporating 223 stages of the first refrigeration circuit 220. This allows for the simplification of the design of the first refrigeration circuit 220 in that passive expansion devices 222, such as capillary tubes or orifice tubes, can be used. This is in contrast to more complex circuits where electronic expansion devices and thermostatic expansion valves need to be used. Since the use of such complex devices is avoided, costs can be reduced and reliability can be increased.

Furthermore, importantly, the provision of a flooded heat exchanger in the second refrigeration circuit according to such embodiments results in improved heat transfer between the first and second circuits. Accordingly, the efficiency of the overall refrigeration system is improved.

There are several advantages that may arise from circuit interface locations being coupled in parallel with other circuit interface locations. One advantage may be that resilience is provided in the system since a fault associated with or suffered at one circuit interface location will not impact other circuit interface locations. This is because each circuit interface location is serviced by a respective branch of the second refrigeration circuit. Another advantage may be that heat transfer efficiency between first and second refrigeration circuits is improved because the temperature of the second refrigerant before each circuit interface location can be kept relatively constant. In contrast, if two circuit interface locations were coupled in series, the temperature of the refrigerant in the second refrigeration circuit may be higher before the downstream circuit interface location, than before the upstream circuit interface location.

Overall, the provision of a plurality of first refrigeration circuits according to the present invention, with each one arranged in a respective refrigeration unit, preferably being arranged as a self-contained refrigeration circuit, has such benefits as: reducing leak rates; simplifying the overall refrigeration system; enabling the use of otherwise unsafe low GWP refrigerants; improving maintenance and installation; and reducing pressure drop, leading to improved system efficiency.

As the person skilled in the art will appreciate, there may be any number of first refrigeration circuits 220. In particular, there may be as many first refrigeration circuits 220 as there are refrigeration units to be cooled. Accordingly, the second refrigeration circuit 210 may be interfaced with any number of first refrigeration circuits 220.

As will be clear to the skilled person, there may be any number and arrangement of medium temperature cooling branches 217 and evaporators 218.

Cascade System 3

In alternative arrangements, each first refrigeration circuit 220 may be arranged fully in parallel with each other first refrigeration circuit 220. An example of such an arrangement is shown in FIG. 3 as is referred to herein for convenience as Cascade System 3. FIG. 3 shows a system 300 where each circuit interface location 231a, 231b, 231c is arranged fully in parallel with each other circuit interface location 231a, 231b, 231c. The components of the system 300 are otherwise the same as in system 200 (described in reference to FIG. 2), and components of the system 300 function in substantially the same way as the system 200, although it will be appreciated that the performance of the overall system and other important features of the overall system can be significantly impacted by this change in the arrangement.

Usefully, this means that a given portion of refrigerant from the second refrigeration circuit 210, which can be any refrigerant as disclosed herein, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, only passes through one heat exchanger 230 before it is returned to the compressor 211. This arrangement thus ensures that each of the heat exchangers 230 will receive second refrigerant at about the same temperature, since the arrangement prevents any of the heat exchanger from receiving a portion of the refrigerant that is pre-warmed as a result of passing through an upstream heat exchanger, as would be the case in a series arrangement;

As will be clear to the person skilled in the art, many other arrangements of the circuit interface locations 231a, 231b, 231c with respect to one and the second refrigeration circuit 210 can be achieved and indeed are envisaged.

An example of a further possible alteration of any of the systems forming part of this disclosure, including in particular any of Cascade Systems 1A, 1B, 2 and 3, is that any number of the self-contained refrigeration circuits may include a suction line heat exchanger (SLHX).

Heat Transfer Methods

The refrigerants, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, and any heat transfer composition of the present invention containing any such refrigerant, can be used in a method of cooling comprising condensing a heat transfer composition and subsequently evaporating said composition in the vicinity of an article or body to be cooled.

Thus, the invention relates to a method of cooling in a heat transfer system comprising an evaporator, a condenser and a compressor, the process comprising i) condensing a refrigerant or heat transfer composition as described herein; and ii) evaporating the refrigerant in the vicinity of body or article to be cooled; wherein the evaporator temperature of the heat transfer system is in the range of from about −40° C. to about +10° C.

Alternatively, or in addition, the heat transfer composition can be used in a method of heating comprising condensing the heat transfer composition in the vicinity of an article or body to be heated and subsequently evaporating said composition.

Thus, the invention relates to a method of heating in a heat transfer system comprising an evaporator, a condenser and a compressor, the process comprising i) condensing a refrigerant or heat transfer composition as described herein, in the vicinity of a body or article to be heated and
ii) evaporating the refrigerant wherein the evaporator temperature of the heat transfer system is in the range of about −30° C. to about 5° C.

Thus, any of the refrigerant and heat transfer compositions described herein can be used in any one of:
 low temperature refrigeration systems;
 medium temperature refrigeration systems;
 vending machines;
 heat pumps, including heat pump water heater;
 dehumidifiers,
 chillers, particularly a positive displacement chillers, more particularly an air cooled or water cooled direct expansion chiller (preferably water cooled), which is either modular or conventionally singularly packaged,
 domestic refrigerators,
 domestic freezers,
 industrial freezers,
 industrial refrigerators,
 water cooler.

The term "refrigeration system" refers to any system or apparatus or any part or portion of such a system or apparatus which employs a refrigerant to provide cooling.

The heat transfer composition of the invention is provided for use in mobile air conditioning applications and in commercial and industrial stationary air conditioning applications, particularly in chillers that cool water to provide air conditioning in commercial and industrial applications. Thus, any of the heat transfer compositions described herein can be used in any one of:
 mobile air conditioning, particularly air conditioning in trucks, buses and trains,
 chiller applications, particularly a positive displacement chiller or a centrifugal chiller used to cool water to provide industrial and/or commercial air conditioning.

The heat transfer compositions of the invention are Iso provided for use in heat pump applications. Thus, any of the heat transfer compositions described herein can be used in any one of:
 a residential heat pump, such as a residential air to water heat pump/hydronic system, water heater heat pumps, dehumidifier,
 an industrial heat pump system, or a commercial heat pump system.

In particular, R-134a used any of the above-listed systems and equipment and/or the below-described systems and equipment may be retrofitted or replaced with the inventive refrigerants and heat transfer compositions of the present invention.

Each of the heat transfer compositions described herein is particularly provided for use in a low temperature refrigeration system (with an evaporator temperature in the range of about −40 to about −12° C., particularly about −32° C.).

Each of the heat transfer compositions described herein is particularly provided for use in a medium temperature refrigeration system (with an evaporator temperature in the range of about −12 to about 0° C., particularly about −7° C.).

Each of the heat transfer compositions described herein is particularly provided for use in a cascade refrigeration system (having a high stage refrigerant and a low stage refrigerant). The heat transfer compositions of the invitation are used as the high stage refrigerant in the cascade system (which generally has an evaporator temperature in the range of about −20 to about 10° C., particularly about −7° C.).

The heat transfer composition of the invention is provided for use in a residential heat pump system, wherein the residential heat pump system is used to supply warm air (said air having a temperature of for example, about 18° C. to about 24° C., particularly about 21° C.) to buildings in the winter. It is usually the same system as the residential air-conditioning system, while in the heat pump mode the refrigerant flow is reversed and the indoor coil becomes the condenser and the outdoor coil becomes the evaporator. Typical system types are split and mini-split heat pump system. The evaporator and condenser are usually a round tube plate fin or microchannel heat exchanger. The compressor is usually a reciprocating or rotary (rolling-piston or scroll) compressor. The expansion valve is usually a thermal or electronic expansion valve. The refrigerant evaporating temperature is preferably in the range of about −20 to about 3° C. The condensing temperature is preferably in the range of about 35 to about 50° C.

The heat transfer composition of the invention is provided for use in a residential air-to-water heat pump hydronic system, wherein the residential air-to-water heat pump hydronic system is used to supply hot water (said water having a temperature of for example about 50° C.) to buildings for floor heating or similar applications in the winter. The hydronic system usually has a round tube plate fin or microchannel evaporator to exchange heat with ambient air, a reciprocating or rotary compressor, a plate condenser to heat the water, and a thermal or electronic expansion valve. The refrigerant evaporating temperature is preferably in the range of about −20 to about 3° C. The condensing temperature is preferably in the range of about 50 to about 90° C.

The heat transfer composition of the invention is provided for use in a commercial air-conditioning system wherein the commercial air conditioning system can be a chiller which is used to supply a chilled heat transfer fluid such as water (said heat transfer fluid, e.g. water, having a temperature of for example about 7° C.) to large buildings such as offices and hospitals, etc. Depending on the application, the chiller system may be running all year long. The chiller system may be air-cooled or water-cooled. The air-cooled chiller usually has a plate or shell-and-tube evaporator to supply chilled water, a centrifugal compressor or a positive displacement compressor which may be a reciprocating or scroll compressor, a round tube plate fin or microchannel condenser to exchange heat with ambient air, and a thermal or electronic expansion valve. The water-cooled system usually has a shell-and-tube evaporator to supply chilled water, a centrifugal compressor or a positive displacement compressor which may be a reciprocating or scroll compressor, a shell-and-tube condenser to exchange heat with water from cooling tower or lake, sea and other natural recourses, and a thermal or electronic expansion valve. The refrigerant evaporating temperature is preferably in the range of about 0 to about 10° C. The condensing temperature is preferably in the range of about 40 to about 70° C.

The heat transfer composition of the invention is provided for use in a medium temperature refrigeration system, wherein the medium temperature refrigeration system is preferably used to chill food or beverages such as in a refrigerator or a bottle cooler, or in a supermarket to chill perishable goods. The system usually has an air-to-refrigerant evaporator to chill the food or beverage, a reciprocating or rotary compressor, an air-to-refrigerant condenser to exchange heat with the ambient air, and a thermal or electronic expansion valve. The refrigerant evaporating temperature is preferably in the range of about −12 to about 0° C. The condensing temperature is preferably in the range of about 40 to about 70° C. Vending machines are an example of medium temperature refrigeration systems.

The heat transfer composition of the invention is provided for use in a low temperature refrigeration system, wherein said low temperature refrigeration system is preferably used in a freezer or an ice cream machine. The system usually has an air-to-refrigerant evaporator to chill the product, a reciprocating or rotary compressor, an air-to-refrigerant condenser to exchange heat with the ambient air, and a thermal or electronic expansion valve. The refrigerant evaporating temperature is preferably in the range of about −40 to about −12° C. The condensing temperature is preferably in the range of about 40 to about 70° C.

The heat transfer composition of the invention is provided for use in a cascade refrigeration system, wherein said cascade refrigeration system is preferably used in applications where there is a large temperature difference (e.g. about 60-80° C., such as about 70-75° C.) between the ambient temperature and the box temperature (e.g. the difference in temperature between the air-side of the condenser in the high stage, and the air-side of the evaporator in the low stage). For example, a cascade system may be used for freezing products in a supermarket.

Each of the heat transfer compositions described herein is particularly provided for use in a vending machine having an evaporator temperature in the range of about −20 to about 10° C., particularly −7° C.

Each of the heat transfer compositions described herein is particularly provided for use in a residential heat pump, such as a residential air to water heat pump hydronic system, having an evaporator temperature in the range of about −20 to about 3° C., particularly about 0.5° C.

Each of the heat transfer compositions described herein is particularly provided for use in a medium temperature refrigeration system (with an evaporator temperature in the range of about −12 to about 0° C., particularly about −7 C).

Each of the heat transfer compositions described herein is particularly provided for use in a water heater heat pump having an evaporator temperature in the range of from about −20° C. to about 25° C.

Each of the heat transfer compositions described herein is particularly provided for use in a dehumidifier having an evaporator temperature in the range of from about 0 to about 10° C.

Each of the heat transfer compositions described herein is particularly provided for use in a air cooled chiller having an evaporator temperature in the range of about 0° C. to about 10° C., particularly about 4.5° C. The air cooled chiller may be an air cooled chiller with a centrifugal compressor or an air cooled chiller with a positive displacement compressor, more particularly an air cooled chiller with a reciprocating or scroll compressor.

Each of the heat transfer compositions described herein is particularly provided for use in a water cooled chiller having an evaporator temperature in the range of about 0° C. to about 10° C., particularly about 4.5° C. The air cooled chiller may be an air cooled chiller with a centrifugal compressor or an air cooled chiller with a positive displacement compressor, more particularly an air cooled chiller with a reciprocating or scroll compressor.

Each of the heat transfer compositions described herein is particularly provided for use in a refrigerator having an evaporator temperature in the range of about −40° C. to about 12° C.

Each of the heat transfer compositions described herein is particularly provided for use in a freezer having an evaporator temperature in the range of about −40° C. to about −12° C.

Each of the heat transfer compositions described herein is particularly provided for use in a cascade refrigeration system (having a high stage refrigerant and a low stage refrigerant). The heat transfer compositions of the invitation are used as the high stage refrigerant in the cascade system (which generally has an evaporator temperature in the range of about −20 to about 10° C., particularly about −7° C.).

Thus, the invention relates to a method of cooling in a heat transfer system comprising an evaporator, a condenser and a compressor, and any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −40° C. to about 10° C.

The invention also relates to a method of cooling in a heat transfer system comprising an evaporator, a condenser and a compressor, and a heat transfer composition comprising any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −40° C. to about 10° C., wherein said heat transfer composition further comprises any stabilizer as described herein, including in particular Stabilizer 1 or Stabilizer 2.

The invention also relates to a method of cooling in a heat transfer system comprising an evaporator, a condenser and a compressor, and a heat transfer composition comprising any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −40° C. to about 10° C., wherein said heat transfer composition further comprises any lubricant as described herein, including in particular Lubricant 1.

The invention also relates to a method of cooling in a heat transfer system comprising an evaporator, a condenser and a compressor, and a heat transfer composition comprising any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-

12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −40° C. to about 10° C., wherein said heat transfer composition further comprises any stabilizer as described herein, including in particular Stabilizer 1 or Stabilizer 2 and any lubricant as described herein, including in particular Lubricant 1.

Thus, the invention relates to a method of cooling in a heat transfer system comprising an evaporator, a condenser and a compressor, and any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −20° C. to about 3° C.

The invention also relates to a method of cooling in a heat transfer system comprising an evaporator, a condenser and a compressor, and a heat transfer composition comprising any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −20° C. to about 3° C., wherein said heat transfer composition further comprises any stabilizer as described herein, including in particular Stabilizer 1 or Stabilizer 2.

The invention also relates to a method of cooling in a heat transfer system comprising an evaporator, a condenser and a compressor, and a heat transfer composition comprising any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −20° C. to about 3° C., wherein said heat transfer composition further comprises any lubricant as described herein, including in particular Lubricant 1.

The invention also relates to a method of cooling in a heat transfer system comprising an evaporator, a condenser and a compressor, and a heat transfer composition comprising any refrigerant of the present invention as described herein, including particularly Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, or any of the heat transfer compositions as described herein, the process comprising the steps of i) condensing the refrigerant, and ii) evaporating the refrigerant in the vicinity of body or article to be cooled, wherein the evaporator temperature of the heat transfer system is in the range of from about −20° C. to about 3° C., wherein said heat transfer composition further comprises any stabilizer as described herein, including in particular Stabilizer 1 or Stabilizer 2 and any lubricant as described herein, including in particular Lubricant 1.

The heat transfer composition disclosed herein is provided as a non-flammable and low Global Warming (GWP) retrofit for the refrigerant R-134a. Each of the heat transfer compositions of the present invention, including heat transfer compositions which includes any one of the refrigerants of the present invention as described herein, including particularly any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, therefore can be used in a method of retrofitting an existing heat transfer system designed to contain or containing R-134a refrigerant. It is preferred that the method does not require substantial engineering modification of the existing system, for example, without modification of the condenser, the evaporator and/or the expansion valve.

As the term is used herein, "retrofit" with respect to a particular heat transfer composition of the present invention means the use of the indicated composition of the present invention in a heat transfer system that had contained therein a different refrigerant composition that had been at least partially removed from the system and in which the indicated composition of the present invention is introduced.

The heat transfer composition disclosed herein is provided as a non-flammable and low Global Warming (GWP) replacement for the refrigerant R-134a. Each of the heat transfer compositions of the present invention, including heat transfer compositions which includes any one of the refrigerants of the present invention as described herein, including particularly any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, therefore can be used as a replacement for R-134a refrigerant, and it is preferred that the method does not require substantial engineering modification of the system, for example, without modification of the condenser, the evaporator and/or the expansion valve.

As the term is used herein, "replacement for" with respect to a particular heat transfer composition of the present invention and a particular existing refrigerant means the use of the indicated composition of the present invention in a heat transfer system that heretofore had been commonly used with that existing refrigerant. By way of example, the heat transfer systems that have heretofore been commonly used with R-134a include the following systems and the representative operating characteristic of evaporator temperature:

R-134a Systems

| System | Evaporator Temp. Range, ° C. (all values understood to be preceeded by "about" |
|---|---|
| Low temperature refrigeration | −40° C. to 12° C. |
| Medium temperature refrigeration | −12° C. to 0° C. |
| Heat Pumps (including water heater heat pumps) | −12° C. to 10° C.; |
| Heat Pumps (including residential heat pumps) | −20° C. to 3° C.; |
| Dehumidifier | −0° C. to 10° C.; |
| Vending machines | −12° C. to 10° C. |

| System | Evaporator Temp. Range, ° C. (all values understood to be preceeded by "about" |
|---|---|
| Chillers | 0° C. to 10° C. |
| Refrigerators | −40° C. to 2° C. |
| Freezers | −40° C. to −12° C. |

Alternatively, the heat transfer composition can be used in a method of retrofitting an existing heat transfer system designed to contain or containing R134a refrigerant, wherein the system is modified for the refrigerant of the invention.

It will be appreciated that when the heat transfer composition is used as a non-flammable and low Global Warming replacement for R-134a or is used in a method of retrofitting an existing heat transfer system designed to contain or containing R134a refrigerant or is used in a heat transfer system which is suitable for use with R134a refrigerant, the heat transfer composition may consist essentially of any the refrigerant of the invention as described herein, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5. Alternatively, the invention encompasses the use of the refrigerant of the invention as a non-flammable and low Global Warming replacement for R-134a or is used in a method of retrofitting an existing heat transfer system designed to contain or containing R134a refrigerant or is used in a heat transfer system which is suitable for use with R134a refrigerant as described herein.

As set out above, the method comprises removing at least a portion of the existing R-134a refrigerant from the system. Preferably, the method comprises removing at least about 5%, about 10%, about 25%, about 50% or about 75% by weight of the R-134a from the system and replacing it with the heat transfer compositions of the invention, including in particular those heat transfer compositions which include in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5.

The compositions of the invention may be employed in systems which are used or are suitable for use with R-134a refrigerant, such as existing or new heat transfer systems.

The refrigerants and heat transfer compositions of the present invention exhibit many of the desirable characteristics of R-134a, such as non-flammability, but have a GWP that is substantially lower than that of R-134a while at the same time having operating characteristics i.e. efficiency (COP), that are substantially similar to or substantially match R-134a.

The refrigerants of the present invention, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, therefore preferably exhibit operating characteristics compared with R134a wherein:

the efficiency (COP) of the refrigerant is from 95 to 105% of the efficiency of R134a.
in heat transfer systems, in which the refrigerant of the invention replaces the R134a refrigerant.

The term "COP" is a measure of energy efficiency and means the ratio of refrigeration or cooling capacity to the energy requirement of the refrigeration system, i.e. the energy to run the compressor, fans, etc. COP is the useful output of the refrigeration system, in this case the refrigeration capacity or how much cooling is provided, divided by how power it takes to get this output. Essentially, it is a measure of the efficiency of the system.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature.

The term "mass flow rate" is the amount "in pounds" of refrigerant passing through a conduit of a given size in a given amount of time.

In order to maintain reliability of the heat transfer system, it is preferred that the refrigerant of the invention, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, further exhibits the following characteristics compared with R-134a:

the discharge temperature is not greater than 10° C. higher than that of R-134a; and/or
the compressor pressure ratio is from 95 to 105% of the compressor pressure ratio of R-134a
in heat transfer systems, in which the composition of the invention is used to replace the R-134a refrigerant.

It will be appreciated by the skilled person that the claimed compositions desirably show a low level of glide. Thus, the refrigerants of present invention, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, provide an evaporator glide of less than 2° C., preferably less than 1.5° C.

The existing heat transfer compositions used with R-134a are preferably refrigeration systems. Thus, each of the heat transfer compositions as described herein can be used to replace R134a in in any one of:

a low temperature refrigeration system,
a medium temperature refrigeration system,
a commercial refrigerator,
a commercial freezer,
a cascade refrigeration system,
an ice machine,
a vending machine,
a domestic freezer,
a domestic refrigerator,
an industrial freezer,
an industrial refrigerator
a water cooler or
a chiller.

The refrigerants of the invention, including in particular Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, are provided to replace R134a in heat pump applications. Thus, each of the heat transfer compositions and refrigerants as described herein, including an of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5 can be used to replace R-134a in any one of:
- a residential heat pump, such as a residential air to water heat pump/hydronic system,
- an industrial heat pump system or
- a commercial heat pump system.

Each of the heat transfer compositions and refrigerants as described herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided to replace R134a in an air cooled chiller (with an evaporator temperature in the range of about 0 to about 10° C., particularly about 4.5° C.), particularly an air cooled chiller with a centrifugal or positive displacement compressor, e.g. an air cooled chiller with a reciprocating or scroll compressor.

Each of the heat transfer compositions and refrigerants described herein, including in particular each of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided to replace R134a in a water cooled chiller (with an evaporator temperature in the range of about 0 to about 10° C., particularly about 4.5° C.), particularly a water cooled chiller with a centrifugal or positive displacement compressor, e.g. a water cooled chiller with a reciprocating or scroll compressor.

Each of the heat transfer compositions and each of the refrigerants described herein, in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided to replace R134a in a residential heat pump, such as a residential air to water heat pump hydronic system (with an evaporator temperature in the range of about −20 to about 3° C., particularly about 0.5° C.).

Each of the heat transfer compositions and refrigerants as described herein, including any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided to replace R134a in a medium temperature refrigeration system (with an evaporator temperature in the range of about −12 to about 0° C., particularly about −7° C.).

Each of the heat transfer compositions and refrigerants described herein, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided to replace R134a in a low temperature refrigeration system (with an evaporator temperature in the range of about −40 to about −12° C., particularly about −32° C.).

Each of the heat transfer compositions and refrigerants described herein, in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided to replace R134a in the high stage of a cascade refrigeration system (where the high stage of the cascade system has an evaporator temperature in the range of about −20 to about 10° C., particularly about −7° C.).

The heat transfer compositions and the refrigerants of the invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is provided for use in a residential heat pump system, wherein the residential heat pump system is used to supply warm air (said air having a temperature of for example, about 18° C. to about 24° C., particularly about 21° C.) to buildings in the winter. It is usually the same system as the residential air-conditioning system, while in the heat pump mode the refrigerant flow is reversed and the indoor coil becomes condenser and the outdoor coil becomes evaporator. Typical system types are split and mini-split heat pump system. The evaporator and condenser are usually a round tube plate fin, a finned or microchannel heat exchanger. The compressor is usually a reciprocating or rotary (rolling-piston or rotary vane) or scroll compressor. The expansion valve is usually a thermal or electronic expansion valve. The refrigerant evaporating temperature is preferably in the range of about −20 to about 3° C. or about −30 to about 5° C. The condensing temperature is preferably in the range of about 35 to about 50° C.

The heat transfer composition and refrigerants of the invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is provided for use in a commercial air-conditioning system wherein the commercial air conditioning system can be a chiller which is used to supply chilled water (said water having a temperature of for example about 7° C.) to large buildings such as offices and hospitals, etc.

Depending on the application, the chiller system may be running all year long. The chiller system may be air-cooled or water-cooled. The air-cooled chiller usually has a plate, tube-in-tube or shell-and-tube evaporator to supply chilled water, a reciprocating or scroll compressor, a round tube plate fin, a finned tube or microchannel condenser to exchange heat with ambient air, and a thermal or electronic expansion valve. The water-cooled system usually has a shell-and-tube evaporator to supply chilled water, a reciprocating, scroll, screw or centrifugal compressor, a shell-and-tube condenser to exchange heat with water from cooling tower or lake, sea and other natural recourses, and a thermal or electronic expansion valve. The refrigerant evaporating temperature is preferably in the range of about 0 to about 10° C. The condensing temperature is preferably in the range of about 40 to about 70° C.

The heat transfer composition and the refrigerants of the invention, including in particular any one of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is provided for use in a residential air-to-water heat pump hydronic system, wherein the residential air-to-water heat pump hydronic system is used to supply hot water (said water having a temperature of for example about 50° C. or about 55° C.) to buildings for floor heating or similar applications in the winter. The hydronic system usually has a round tube plate fin, a finned tube or microchannel evaporator to exchange heat with ambient air, a reciprocating, scroll or rotary compressor, a plate, tubein-tube or shell-in-tube condenser to heat the water, and a thermal or electronic expansion valve. The refrigerant evaporating temperature is preferably in the range of about −20 to about 3° C., or −30° C. to about 5° C. The condensing temperature is preferably in the range of about 50° C. to about 90° C.

Each of the heat transfer compositions and the refrigerants of the invention, including in particular any one Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided for use in a medium temperature refrigeration system. Medium temperature refrigeration systems utilize one or more compressors and a condenser temperature of from about 20° C. to about 60° C. and preferably about 25° C. to about 45° C. Medium temperature refrigeration systems have an evaporator temperature of from about −25° C. to less than about 0° C., more preferably from about −20° C. to about −5° C., and most preferably about −10° C. to about −6.7° C. Moreover, in preferred embodiments of such medium temperature refrigeration systems, the systems have a degree of superheat at the evaporator outlet of from about 0° C. to about 10° C., and preferably with a degree of superheat at the evaporator outlet of from about 4° C. to about 6° C.

Furthermore, in preferred embodiments of such systems, medium temperature refrigeration systems have a degree of superheat in the suction line of from about 5° C. to about 40° C., and more preferably about 15° C. to about 30° C.

Each of the heat transfer compositions and the refrigerants of the invention, including in particular each of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is particularly provided for use in a low temperature refrigeration. Low temperature refrigeration systems utilize one or more compressors and a condenser temperature of from about 20° C. to about 60° C. and preferably from about 25° C. to about 45° C. Low temperature refrigeration systems have an evaporator temperature of from about −45° C. to less than about 0° C., more preferably from about −40 to about −12° C., even more preferably from about −35° C. to about −25° C., and most preferably about −32° C. Moreover, preferably, the low temperature refrigeration systems have a degree of superheat at evaporator outlet of from about 0° C. to about 10° C., and preferably with a degree of superheat at evaporator outlet of from about 4° C. to about 6° C. Furthermore, preferably, low temperature refrigeration systems have a degree of superheat in the suction line of from about 15° C. to about 50° C., and preferably with a degree of superheat in the suction line of from about 25° C. to about 30° C.

The heat transfer composition and the refrigerants of the invention, including in particular each of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is provided for use in a medium temperature refrigeration system, wherein the medium temperature refrigeration system is preferably used to chill food or beverages such as in a refrigerator or a bottle cooler. The system usually has an air-to-refrigerant evaporator to chill the food or beverage, a reciprocating, scroll or screw or rotary compressor, an air-to-refrigerant condenser to exchange heat with the ambient air, and a thermal or electronic expansion valve.

The heat transfer composition and the refrigerants of the invention, including in particular each of Refrigerants 1-23, Refrigerants 1NF-23NF, Refrigerants 1GWP150-23GWP150, Refrigerants 1NFGWP150-23NFGWP150, Refrigerants 1GWP5-12GWP5, and Refrigerants 1NFGWP5-12NFGWP5, is provided for use in a low temperature refrigeration system, wherein said low temperature refrigeration system is preferably used in a freezer or an ice making machine. The system usually has an air-to-refrigerant evaporator to chill the food or beverage, a reciprocating, scroll or rotary compressor, an air-to-refrigerant condenser to exchange heat with the ambient air, and a thermal or electronic expansion valve.

EXAMPLES

The refrigerant compositions identified in Table 1A and Table 1B below were analyzed as described herein. Each composition was subjected to thermodynamic analysis to determine its ability to match the operating characteristics of R-134a in various refrigeration systems. The analysis was performed using experimental data collected for properties of various binary pairs of components used in the composition. The vapor/liquid equilibrium behavior of $CF_3I$ was determined and studied in a series of binary pairs with each of HFCO-1233zd(E), HFO-1234ze(E) and HFC-227ea. The vapour liquid equilibrium behavior of CF3I was studied in a series of binary pairs with HFCO-1233zd(E) and HFC-227ea. The vapour liquid equilibrium behavior of the binary pairs of HFCO-1233zd(E) and HFC-227ea was also studied. The composition of each binary pair was varied over a series of relative percentages in the experimental evaluation and the mixture parameters for each binary par were regressed to the experimentally obtained data. Data for individual components is available in the National Institute of Science and Technology (NIST) Reference Fluid Thermodynamic and Transport Properties Database software (Refprop 9.1 NIST Standard Database 2013) and was as needed in the Examples. The parameters selected for conducting the analysis were: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

TABLE 1A

Refrigerants of the invention

| Refrigerant | R1234ze(E) (wt %) | R1233zd(E) (wt %) | CF3I (wt %) |
| --- | --- | --- | --- |
| A1 | 78.0% | 1.0% | 21.0% |
| A2 | 77.0% | 2.0% | 21.0% |
| A3 | 78.0% | 2.0% | 20.0% |
| A4 | 80.0% | 2.0% | 18.0% |
| A5 | 82.0% | 2.0% | 16.0% |
| A6 | 83.0% | 2.0% | 15.0% |

TABLE 1B

Refrigerants of the invention

| Refrigerant | R1234ze(E) (wt %) | R1233zd(E) (wt %) | HFC-227ea (wt %) | CF3I (wt %) |
| --- | --- | --- | --- | --- |
| B1 | 87.0% | 2.0% | 4.4% | 6.6% |
| B2 | 84.0% | 2.0% | 4.4% | 9.6% |
| B3 | 81.0% | 2.0% | 4.4% | 12.6% |

TABLE 1B-continued

| | Refrigerants of the invention | | | |
|---|---|---|---|---|
| Refrigerant | R1234ze(E) (wt %) | R1233zd(E) (wt %) | HFC-227ea (wt %) | CF3I (wt %) |
| B4 | 78.0% | 2.0% | 4.4% | 15.6% |
| B5 | 75.0% | 2.0% | 4.4% | 18.6% |

Example 1A: Thermodynamic Glide

In systems containing direct expansion evaporators, the evaporator manufacturer generally sets a design limit of a pressure drop which is equivalent to a loss of 1° C. to 2° C. in saturation temperature from the inlet to the outlet of the evaporator (Encyclopedia of Two Phase heat transfer and Flow I, John T Thome, chapter 6, p 144).

The saturation temperature in the evaporator tends to increase for refrigerants with glide. This increase in temperature is equal to the glide of the refrigerant in the evaporator. The actual temperature variation in the evaporator is the net effect of both of these processes. Therefore, a refrigerant with a glide of less than 2° C. in the evaporator will have an almost constant temperature in the evaporator. This will lead to a very efficient heat exchanger design, especially for applications such as reversible heat pumps where the refrigerant flow changes direction in the heat exchanger, depending on the mode of operation (i.e. heating or cooling).

The thermodynamic glide was determined by experimentally measuring the interaction parameters with the binary pairs of refrigerants (HFO-1234ze(E)/HFCO-1233zd(E), HFO-1234ze(E)/CF$_3$I, HFCO-1233zd(E)/CF$_3$I) and using NIST Refprop 9.1 for calculating the difference in bubble (liquid) and dew (vapor) temperatures.

The observed glide was unexpectedly lower than predicted by the NIST Refprop 9.1 database which uses estimated interaction parameters (without experimental data) between the binary pairs.

TABLE 2

Thermodynamic glide of Refrigerant A2

| | Blend A2 (R1234ze(E)/R1233zd(E)/CF3I 78%/2%/20%) | |
|---|---|---|
| Temperature (° C.) | Thermodynamic glide with modeled binary interaction (° C.) | Thermodynamic glide with binary interaction determined experimentally (° C.) |
| 40 | 1.8 | 1.3 |
| 10 | 2.4 | 1.7 |
| 0 | 2.6 | 1.8 |
| −10 | 2.9 | 2.0 |

The above data demonstrates that the claimed compositions have a lower glide than predicted by modelling without taking into account the unpredictable interaction between the three components of the blend.

Example 1B: Thermodynamic Glide

The procedure of Example 1A is repeated except of the composition B2. The thermodynamic glide was determined by experimentally measuring the interaction parameters with the binary pairs of refrigerants (HFO-1234ze(E)/HFCO-1233zd(E), HFO-1234ze(E)/CF$_3$I, HFO-1234ze(E)/HFC-227ea, HFCO-1233zd(E)/CF$_3$I, HFC-227ea/CF$_3$I, HFCO-1233zd(E)/HFC-227ea) and using NIST Refprop 9.1 for calculating the difference in bubble (liquid) and dew (vapor) temperatures.

The observed glide was unexpectedly lower than predicted by the NIST Refprop 9.1 database which uses estimated interaction parameters (without experimental data) between the binary pairs.

TABLE 2

Thermodynamic glide of Refrigerant B2

| | Blend B2 (R1234ze(E)/R227ea/CF3I/ R1233zd(E) 84%/4.4%/9.6%/2%) | |
|---|---|---|
| Temperature (° C.) | Thermodynamic glide with modeled binary interaction (° C.) | Thermodynamic glide with binary interaction determined experimentally (° C.) |
| 40 | 1.4 | 1.1 |
| 10 | 1.9 | 1.4 |
| 0 | 2.0 | 1.5 |
| −10 | 2.2 | 1.6 |

The above data demonstrates that the claimed compositions have a lower glide than predicted by modelling without taking into account the unpredictable interaction between the four components of the blend.

Example 2A: Flammability

Both CF$_3$I and HFCO-1233zd(E) are known to be non-flammable refrigerants, and can act to suppress the flammability of refrigerant blends which contain flammable components.

As set out in Table 3A below, a binary composition containing HFO-1234ze(E) and CF$_3$I requires at least 35% of CF$_3$I in order to render the composition non-flammable. Furthermore, a binary composition containing HFCO-1233zd(E) and HFO-1234ze(E) requires at least 31% of HFCO-1233zd(E) to render the composition non-flammable.

However, the inventors have surprisingly discovered that when CF$_3$I and HFCO-1233zd(E) are both used, the composition requires much less of these components in order to be non-flammable. For example, a composition containing 20% of a combination of HFCO-1233zd(E) and CF$_3$I is non-flammable.

TABLE 3A

Assessment of flammability

| Refrigerant | Flammability | % R1234ze(E) | % R1233zd(E) | % CF3I |
|---|---|---|---|---|
| Comparative C1 | Non-flammable | 69% | 31% | — |
| Comparative C2 | Non-flammable | 65% | — | 35% |
| A3 | Non-flammable | 80% | 2% | 18% |

Example 2B: Flammability

HFC-227ea, CF$_3$I and HFCO-1233zd(E) are known to be non-flammable refrigerants. CF$_3$I and HFCO-1233zd(E) can act to suppress the flammability of refrigerant blends which contain flammable components.

As set out in Table 3B below, a binary composition containing HFO-1234ze(E) and $CF_3I$ requires at least 35% of $CF_3I$ in order to render the composition non-flammable. Furthermore, a binary composition containing HFCO-1233zd(E) and HFO-1234ze(E) requires at least 31% of HFCO-1233zd(E) to render the composition non-flammable.

While a binary composition of R-227ea and R1234ze(E) requires 12% of R227ea in order to render the composition non-flammable, this composition has a GWP of 403, and therefore does not meet the requirements of the preferred embodiments of the invention, that is, a non-flammable composition having a GWP of less than 150.

However, the inventors have surprisingly discovered that when R227ea, $CF_3I$ and HFCO-1233zd(E) are all used with HFO1234ze(E), the composition requires a much smaller amount of these components in order to be non-flammable, as compared to using $CF_3I$ or HFCO-1233zd(E) alone. For example, a composition containing 15% of a combination of HFCO-1233zd(E), $CF_3I$ is non-flammable, while at the same time having a GWP of less than 150.

TABLE 3

Assessment of flammability

| Refrigerant | Flammability | % R1234ze(E) | % R1233zd(E) | % CF3I | % R227ea |
|---|---|---|---|---|---|
| Comparative C1 | Non-flammable | 69% | 31% | — | |
| Comparative C2 | Non-flammable | 65% | — | 35% | |
| Comparative C3 | Non-flammable | 88% | — | — | 12% |
| B2 | Non-flammable | 84% | 2% | 9.6% | 4.4% |

Example 3: Performance

Example 3A: Performance in a $CO_2$ Cascade Refrigeration System

Cascade systems are generally used in applications where there is a large temperature difference (e.g. about 60-80° C., such as about 70-75° C.) between the ambient temperature and the box temperature (e.g. the difference in temperature between the air-side of the condenser in the high stage, and the air-side of the evaporator in the low stage). For example, a cascade system may be used for freezing products in a supermarket.

Figure 4:
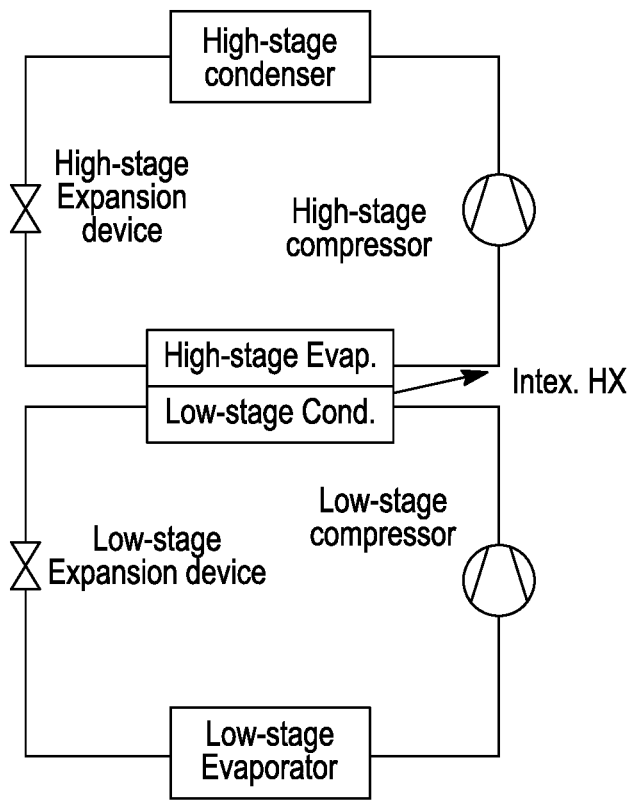
FIG. 4 shows an alternative cascaded refrigeration system according to embodiments of the invention.
Figure 5:
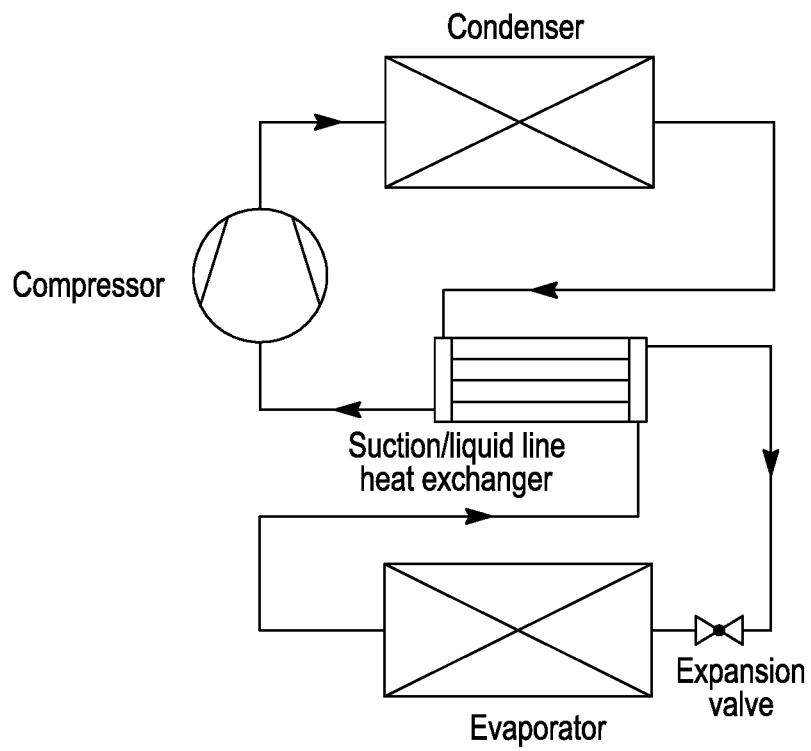
FIG. 5 shows an alternative cascaded refrigeration system according to embodiments of the invention.

In the following Example, exemplary compositions of the invention were tested as the refrigerant in the high stage of a cascade refrigeration system. The refrigerant used in the low stage of the system was carbon dioxide. A schematic of an exemplary cascade system is shown in FIG. 4 and the results are reported in Table 4A.

Operating Conditions:
1. Condensing temperature=45° C.
2. Condensing Temperature−Ambient Temperature=10° C.
3. Condenser sub-cooling=0.0° C. (system with receiver)
4. Evaporating temperature=−30° C., Corresponding box temperature=−18° C.
5. Evaporator Superheat=3.3° C.
6. Compressor Isentropic Efficiency=65%
7. Volumetric Efficiency=100%
8. Temperature Rise in Suction Line Low Stage=15° C.
9. Temperature Rise in Suction Line High Stage=10° C.
10. Intermediate Heat Exchanger $CO_2$ Condensing Temperature=15° C., 20° C. and 25° C.
11. Intermediate Heat Exchanger Superheat=3.3° C.
12. Difference in Temperature in Intermediate Heat Exchanger=8° C.

TABLE 4

Performance in CO2 Cascade Refrigeration System

| Refrigerant | Efficiency @ Tcond = 15° C. | Efficiency @ Tcond = 20° C. | Efficiency @ Tcond = 25° C. |
|---|---|---|---|
| R134a | 100% | 100% | 100% |
| A1 | 100% | 101% | 101% |
| A2 | 100% | 101% | 101% |
| A3 | 100% | 101% | 101% |
| A4 | 100% | 101% | 101% |
| A5 | 100% | 101% | 101% |
| A6 | 100% | 101% | 101% |

Table 4A shows the performance of refrigerants A1 to A5 in the high side of a cascade refrigeration system
Composition A1 to A5 match the efficiency of R134a for different condensing temperatures of the low stage cycle

Example 3B: $CO_2$ Cascade Refrigeration System

Example 3A is repeated except using compositions B1-B5 and with the adjustment of the operating conditions as indicated below:

Operating Conditions:
1. Condensing temperature=45° C.
2. Condensing Temperature−Ambient Temperature=10° C.
3. Condenser sub-cooling=0.0° C. (system with receiver)
4. Evaporating temperature=−30° C., Corresponding box temperature=−18° C.
5. Evaporator Superheat=3.3° C.
6. Compressor Isentropic Efficiency=65%
7. Volumetric Efficiency=100%
8. Temperature Rise in Suction Line Low Stage=15° C.
9. Temperature Rise in Suction Line High Stage=10° C.
10. Intermediate Heat Exchanger $CO_2$ Condensing Temperature=15° C., 20° C. and 25° C.
11. Intermediate Heat Exchanger Superheat=3.3° C.
12. Difference in Temperature in Intermediate Heat Exchanger=8° C.

The results are reported in Table 4B below.

TABLE 4B

Performance in CO2 Cascade Refrigeration System

| Refrigerant | Efficiency @ Tcond = 15° C. | Efficiency @ Tcond = 20° C. | Efficiency @ Tcond = 25° C. |
|---|---|---|---|
| R134a | 100% | 100% | 100% |
| B1 | 100% | 100% | 101% |
| B2 | 100% | 100% | 101% |
| B3 | 100% | 100% | 101% |
| B4 | 100% | 100% | 101% |
| B5 | 100% | 100% | 101% |

The results are reported in Table 4B below.
Table 4B shows the performance of exemplary refrigerants of the invention in a cascade refrigeration system. Composition B1 to B5 match the efficiency of R134a at varying condensing temperatures of low stage cycle.

Example 4A: Performance in Air-Source Heat Pump Water Heaters with Suction Line/Liquid Line Heat Exchanger The compositions of the invention may be used in a residential air-to-water heat pump hydronic system. A residential air-to-water heat pump hydronic system is generally used to supply hot water (said water having a temperature of for example about 50° C.) to buildings for floor heating or similar applications in the winter. The hydronic system usually has a round tube plate fin or microchannel evaporator to exchange heat with ambient air, a reciprocating or rotary compressor, a plate condenser to heat the water, and a thermal or electronic expansion valve. The refrigerant evaporating temperature is preferably in the range of about −20 to about 3° C. The condensing temperature is preferably in the range of about 50 to about 90° C.

Table 5A shows performance of refrigerants in a heat pump water heater with and without a suction line/liquid line heat exchanger (SL/LL HX)

Composition A1 to A5 show higher efficiency than R134a when a SL/LL Heat Exchanger is employed Composition A1 to A5 show lower discharge temperature than R134a, indicating better reliability for the compressor.

Example 4B: Performance in Air-Source Heat Pump Water Heaters with Suction Line/Liquid Line Heat Exchanger Example 4B is repeated except using compositions B1-B5, and the results are reported in Table 5B below:

TABLE 5B

| | Performance in Heat Pump Water Heaters with SL/LL HX | | | | | | | |
|---|---|---|---|---|---|---|---|---|
| | No-SL-LL HX | | SL-LL HX Eff. 35% | | SL-LL HX Eff. 55% | | SL-LL HX Eff. 75% | |
| Refrigerant | Efficiency | Comp. Discharge Temp (° C.) | Efficiency | Comp. Discharge Temp (° C.) | Efficiency | Comp. Discharge Temp (° C.) | Efficiency | Comp. Discharge Temp (° C.) |
| R134a | 100% | 92.5 | 100% | 117.9 | 100% | 123.7 | 100% | 134.8 |
| B1 | 100% | 82.8 | 101% | 108.0 | 101% | 113.3 | 102% | 124.2 |
| B2 | 100% | 83.1 | 101% | 108.3 | 101% | 113.6 | 102% | 124.5 |
| B3 | 100% | 83.5 | 101% | 108.6 | 101% | 114.0 | 102% | 124.9 |
| B4 | 100% | 83.9 | 101% | 108.9 | 101% | 114.4 | 102% | 125.2 |
| B5 | 100% | 84.2 | 101% | 109.2 | 101% | 114.7 | 102% | 125.6 |

In the following Example, exemplary compositions of the invention were tested in a heat pump water heater system, with and without a Suction Line/Liquid Line Heat Exchanger. A schematic of a heat pump water heater system, with a Suction Line/Liquid Line Heat Exchanger is shown in FIG. 2 and reported in Table 5A below.
Operating Conditions:
1. Condensing temperature=55° C.
2. Water Inlet Temperature=45° C., Water Outlet Temperature=50° C.
3. Condenser sub-cooling=5.0° C.
4. Evaporating temperature=−5° C., Corresponding ambient temperature=10° C.
5. Evaporator Superheat=3.5° C.
6. Compressor Isentropic Efficiency=60%
7. Volumetric Efficiency=100%
8. Temperature Rise in Suction Line=5° C.
9. Suction Line/Liquid Line Heat Exchanger Effectiveness: 0%, 35%, 55%, 75%

Table 5B shows the performance of exemplary refrigerants of the invention in a heat pump water heater with and without a suction line/liquid line heat exchanger (SL/LL HX)

Composition B1 to B5 show the same efficiency (COP) as R134a in the system without a SL/LL Heat Exchanger, and a better efficiency (COP) than R134a when a SL/LL Heat Exchanger is employed Composition B1 to B5 show lower discharge temperature than R134a, indicating better reliability for the compressor.

Example 5: Performance in Vending Machines with Suction Line/Liquid Line Heat Exchanger The compositions of the invention may be used in medium temperature systems. A medium temperature refrig-

TABLE 5A

| | Performance in Heat Pump Water Heaters with SL/LL HX | | | | | | | |
|---|---|---|---|---|---|---|---|---|
| | No-SL-LL HX | | SL-LL HX Eff. 35% | | SL-LL HX Eff. 55% | | SL-LL HX Eff. 75% | |
| Refrigerant | Efficiency | Comp. Discharge Temp (° C.) | Efficiency | Comp. Discharge Temp (° C.) | Efficiency | Comp. Discharge Temp (° C.) | Efficiency | Comp. Discharge Temp (° C.) |
| R134a | 100% | 92.5 | 100% | 117.9 | 100% | 123.7 | 100% | 134.8 |
| A1 | 100% | 84.9 | 101% | 110.3 | 101% | 115.7 | 102% | 126.7 |
| A2 | 100% | 85.4 | 101% | 110.4 | 101% | 116.0 | 102% | 126.9 |
| A3 | 100% | 85.2 | 101% | 110.3 | 101% | 115.8 | 102% | 126.7 |
| A4 | 100% | 85.0 | 101% | 110.1 | 101% | 115.6 | 102% | 126.5 |
| A5 | 100% | 84.8 | 101% | 109.8 | 101% | 115.3 | 102% | 126.2 |
| A6 | 100% | 84.6 | 101% | 109.7 | 101% | 115.2 | 102% | 126.1 | eration system is preferably used to chill food or beverages such as in a refrigerator or a bottle cooler, or in a supermarket to chill perishable goods. The system usually has an air-to-refrigerant evaporator to chill the food or beverage, a reciprocating or rotary compressor, an air-to-refrigerant condenser to exchange heat with the ambient air, and a thermal or electronic expansion valve. The refrigerant evaporating temperature is preferably in the range of about −12 to about 0° C. The condensing temperature is preferably in the range of about 40 to about 70° C. Vending machines are an example of medium temperature refrigeration systems.

In the following Example, exemplary compositions of the invention were tested in a vending machine system, with and without a Suction Line/Liquid Line Heat Exchanger, and the results are reported in Table 6 below.

Operating Conditions:

1. Condensing temperature=45° C.
2. Condensing Temperature−Ambient Temperature=10° C.
3. Condenser sub-cooling=5.5° C.
4. Evaporating temperature=−8° C., Corresponding box temperature=1.7° C.
5. Evaporator Superheat=3.5° C.
6. Compressor Isentropic Efficiency=60%
7. Volumetric Efficiency=100%
8. Temperature Rise in Suction Line=5° C.
9. Suction Line/Liquid Line Heat Exchanger Effectiveness: 0%, 35%, 55%, 75%

TABLE 6

Performance in Vending Machine with SL/LL HX

| Refrigerant | Efficiency @0% | Efficiency @35% | Efficiency @55% | Efficiency @75% |
|---|---|---|---|---|
| R134a | 100% | 100% | 100% | 100% |
| A1 | 99% | 101% | 101% | 102% |
| A2 | 99% | 101% | 101% | 102% |
| A3 | 99% | 101% | 101% | 102% |
| A4 | 99% | 101% | 101% | 102% |
| A5 | 99% | 101% | 101% | 102% |
| A6 | 99% | 101% | 101% | 102% |

Table 6 shows performance of refrigerants in a vending machine system with and without a suction line/liquid line heat exchanger (SL/LL HX)

Composition A1 to A5 show higher efficiency than R134a when a SL/LL Heat Exchanger is employed.

Example 6: Medium Temperature Refrigeration System with Suction Line/Liquid Line (SL/LL) Heat Exchanger The compositions of the invention may be used in medium temperature systems. A medium temperature refrigeration system is preferably used to chill food or beverages such as in a refrigerator or a bottle cooler, or in a supermarket to chill perishable goods. The system usually has an air-to-refrigerant evaporator to chill the food or beverage, a reciprocating or rotary compressor, an air-to-refrigerant condenser to exchange heat with the ambient air, and a thermal or electronic expansion valve. The refrigerant evaporating temperature is preferably in the range of about −12 to about 0° C. The condensing temperature is preferably in the range of about 40 to about 70° C.

In the following Example, exemplary compositions of the invention were tested in a medium temperature refrigeration system, with and without a Suction Line/Liquid Line Heat Exchanger. A schematic of a medium temperature refrigeration system, with a Suction Line/Liquid Line Heat Exchanger is shown in FIG. 1 and the results are reported in Table 7 below.

Operating Conditions:

1. Condensing temperature=45° C.
2. Condensing Temperature−Ambient Temperature=10° C.
3. Condenser sub-cooling=0.0° C. (system with receiver)
4. Evaporating temperature=−8° C., Corresponding box temperature=1.7° C.
5. Evaporator Superheat=5.5° C.
6. Compressor Isentropic Efficiency=65%
7. Volumetric Efficiency=100%
8. Temperature Rise in Suction Line=10° C.
9. Suction Line/Liquid Line Heat Exchanger Effectiveness: 0%, 35%, 55%, 75%

TABLE 7

Performance in a Medium-Temperature Refrigeration System with SL/LL HX

| Refrigerant | Efficiency @0% | Efficiency @35% | Efficiency @55% | Efficiency @75% |
|---|---|---|---|---|
| R134a | 100% | 100% | 100% | 100% |
| B1 | 100% | 101% | 101% | 102% |
| B2 | 100% | 101% | 101% | 102% |
| B3 | 100% | 101% | 101% | 102% |
| B4 | 100% | 101% | 101% | 102% |
| B5 | 100% | 101% | 101% | 102% |

Table 4 shows the performance of exemplary refrigerants of the invention in a medium temperature refrigeration system as compared to R134a Composition B1 to B5 show the same efficiency (COP) as R134a in the system without a SL/LL Heat Exchanger, and a better efficiency (COP) than R134a when a SL/LL Heat Exchanger is employed.

Comparative Example C1: Comparative Cascade System 1B

Table C1 below shows the results of a cascade refrigeration system described in reference to FIG. 1B both with and without a mechanical subcooler in which the refrigerant in the secondary loop and the primary loop is R404A.

TABLE C1

| Systems | Medium temperature (second refrigeration circuit) | Low temperature (first refrigeration circuit) | Power [kW] | Capacity [kW] | COP [—] | Relative COP % of R404A (% of R404A w mech SC) |
|---|---|---|---|---|---|---|
| Comparative example | R404A | | 54.8 | 100 | 1.823487 | 100% |
| Comparative example with mechanical subcooler | | | 49.6 | 100 | 2.016129 | 110.6% (100%) |

Table C1 above includes information on the coefficient of performance (COP) of each system. The COP is the ratio of useful cooling output from the system to work input to the system. Higher COPs equate to lower operating costs. The relative COP is the COP relative to the comparative example refrigeration system with no subcooling.

Example 7: Cascade System 2

Table 8 below shows the results of a cascade refrigeration system described in reference to FIG. 2 both with and without a mechanical subcooler in which the refrigerant in the secondary loop is each of refrigerants A2 and B2 as described above and in which the refrigerant in the primary loop is R404A. The results are reported in Table 8 below, with the results from Comparative Example 1 being repeated in the Table for convenience.

TABLE 8

| Systems | Medium temperature (second refrigeration circuit) | Low temperature (first refrigeration circuit) | Power [kW] | Capacity [kW] | COP [—] | Relative COP % of R404A (% of R404A w mech SC) |
|---|---|---|---|---|---|---|
| Comparative example (FIG. 1B) | R404A | | 54.8 | 100 | 1.82 | 100% |
| Comparative example with mechanical subcooler (FIG. 1 B) | | | 49.6 | 100 | 2.02 | 110.6% (100%) |
| Example 7 (FIG. 2) | A2 | R744 | 46.6 | 100 | 2.14 | 117.6% (106.3%) |
| | B2 | R744 | 46.8 | 100 | 2.14 | 117.2% (106.0%) |

It is clear from Table 8 that the cascaded refrigeration circuit which uses the refrigerants A2 and B2 of the present invention in the secondary loop in accordance with Cascade System 2 (FIG. 2) achieves the lowest power consumption and the best COP compared to the comparative systems.

The results shown in Tables C1 and 8 are based on the below assumptions, where MT means medium temperature (second refrigeration circuit) and LT means low temperature (first refrigeration circuit) and units are as given.

Load distribution
LT: ⅓ (33,000 W)
MT: ⅔ (67,000 W)
Volumetric efficiency: 95% for both MI ad LT Isentropic efficiency
R404A: MT/LT, 012/0.68
Condensing temperature: 105 F
MT evaporation temperature: 20 F (22 F for Self-contained units due to lower pressure drop)
LI evaporation temperature: −25 F
Evaporator superheat: 10 F
Suction line temperature rise
Comparative example: MT: 25 F; LT: 50 F
Cascade/self-contained: MT: 10 F; LT: 25 F (Self-contained units have shorter lines and therefore less heat infiltration)
Cascade/pumped: MT: 10 F; LT; 25 F
Mechanical sub cooler outlet temperature: 50 F Example 8: Cascade System 2 with Suction Line Liquid Line Heat Exchanger Table 9 below shows the results of a cascade refrigeration system described in reference to FIG. 2 both with and without a mechanical subcooler but which in addition has a SLHX installed in the second refrigeration loop, with the refrigerant in the secondary loop being in one case refrigerant A2 and in the other case refrigerant B2 as described above and in which the refrigerant in the primary loop is A404A. The results are reported in Table 9 below, with the results from Comparative Example 1 being repeated in the Table for convenience.

TABLE 8

| | Medium temperature (second refrigeration circuit) | Low temperature (first refrigeration circuit) | Power [kW] | Capacity [kW] | COP [—] | Relative COP % of R404A (% of R404A w mech SC) |
|---|---|---|---|---|---|---|
| Comparative example (FIG. 1B) | | R404A | 54.8 | 100 | 1.82 | 100% |
| Comparative example with mechanical subcooler (FIG. 1 B) | | | 49.6 | 100 | 2.02 | 110.6% (100%) |
| Example 7 (FIG. 2) | A2 | R744 | 43.97 | 100 | 2.27 | 124.7% (112.8%) |
| | B2 | R744 | 43.98 | 100 | 2.27 | 124.7% (112.8%) |

It is clear from Table 8 that the cascaded refrigeration circuit which uses the refrigerants A2 and 82 of the present invention in the secondary loop in accordance with Cascade System 2 (FIG. 2) and an suction line liquid line heat exchanger (SLHX) achieves the lowest power consumption and the best COP compared to the comparative systems and to the system of FIG. 2 but without the SLHX.

The results shown in Tables C1 and 8 are based on the below assumptions, where MT means medium temperature (second refrigeration circuit) and LT means low temperature (first refrigeration circuit) and units are as given.

Load distribution
LT: ⅓ (33,000 W)
MI: ⅔ (67,000 W)
Volumetric efficiency: 95% for both MT ad LT
Isentropic efficiency
R404A: MT/LT, 0/2/0.68
Condensing temperature: 105 F
MT evaporation temperature: 20 F (22 F for Self-contained units due to lower pressure drop)
LT evaporation temperature: −25 F
Evaporator superheat: 10 F
Suction line temperature rise
Comparative example: MT: 25 F; LT: 50 F
Cascade/self-contained: MT: 10 F; LT: 25 F (Self-contained units have shorter lines and therefore less heat infiltration)
Cascade/pumped: MT: 10 F; LI: 25 F
Mechanical sub cooler outlet temperature: 50 F

Numbered Embodiment 1

A refrigerant comprising at least about 97% by weight of the following three compounds, with each compound being present in the following relative percentages of:
from 1% by weight to 3% by weight trans-1-chloro-3,3,3-trifluoropropene (HFCO-1233zd(E),
from about 77% by weight to about 83% by weight trans-1,3,3,3-tetrafluoropropene (HFO-1234ze(E), and
from about 15% by weight to about 21% by weight trifluoroiodomethane (CF3I).

Numbered Embodiment 2

The refrigerant of numbered embodiment 1 wherein the refrigerant of three compounds is:
from 1% by weight to 3% by weight trans-1-chloro-3,3,3-trifluoropropene (HFCO-1233zd(E),
from about 77% by weight to about 83% by weight trans-1,3,3,3-tetrafluoropropene (HFO-1234ze(E), and
from about 18% by weight to about 21% by weight trifluoroiodomethane (CF3I).

Numbered Embodiment 3

The refrigerant of numbered embodiment 1 or numbered embodiment 2 wherein the refrigerant of three compounds is from 1% by weight to 3% by weight HFCO-1233zd(E),
from about 77% by weight to about 80% by weight HFO-1234ze(E), and
from about 18% by weight to about 21% by weight trifluoroiodomethane (CF3I).

Numbered Embodiment 4

The refrigerant of any one of numbered embodiments 1 to 3 wherein the HFCO-1233zd(E) is present in an amount of 2%+/−0.5% by weight of the composition.

Numbered Embodiment 5

The refrigerant of any one of numbered embodiments 1 to 4 wherein the refrigerant of three compounds is
2%+/−0.5% by weight HFCO-1233zd(E),
about 78% by weight HFO-1234ze(E), and
about 20% by weight trifluoroiodomethane (CF3I).

Numbered Embodiment 6

The refrigerant of any one of numbered embodiments 1 to 5 wherein the refrigerant of three compounds is
2%+/−0.5% by weight HFCO-1233zd(E),
78%+/−0.5% by weight HFO-1234ze(E), and
20%+/−0.5% by weight trifluoroiodomethane (CF3I).

Numbered Embodiment 7

The refrigerant as claimed in numbered embodiments 1 to 6 wherein the refrigerant comprises at least about 98.5% by weight of said refrigerant of said three compounds.

Numbered Embodiment 8

A refrigerant consisting essentially of the following three compounds, with each compound being present in the following relative percentages of:

from 1% by weight to 3% by weight trans-1-chloro-3,3,3-trifluoropropene (HFCO-1233zd(E),
from about 77% by weight to about 83% by weight trans-1,3,3,3-tetrafluoropropene (HFO-1234ze(E), and
from about 15% by weight to about 21% by weight trifluoroiodomethane (CF3I).

Numbered Embodiment 9

The refrigerant of numbered embodiment 8 wherein the refrigerant of three compounds is:
from 1% by weight to 3% by weight trans-1-chloro-3,3,3-trifluoropropene (HFCO-1233zd(E),
from about 77% by weight to about 83% by weight trans-1,3,3,3-tetrafluoropropene (HFO-1234ze(E), and
from about 18% by weight to about 21% by weight trifluoroiodomethane (CF3I).

Numbered Embodiment 10

The refrigerant of numbered embodiment 8 or numbered embodiment 9 wherein the refrigerant of three compounds is
from 1% by weight to 3% by weight HFCO-1233zd(E),
from about 77% by weight to about 80% by weight HFO-1234ze(E), and
from about 18% by weight to about 21% by weight trifluoroiodomethane (CF3I).

Numbered Embodiment 11

The refrigerant of any one of numbered embodiments 8 to 10 wherein the HFCO-1233zd(E) is present in an amount of 2%+/−0.5% by weight of the composition.

Numbered Embodiment 12

The refrigerant of any one of numbered embodiments 8 to 11 wherein the refrigerant of three compounds is
2%+/−0.5% by weight HFCO-1233zd(E),
about 78% by weight HFO-1234ze(E), and
about 20% by weight trifluoroiodomethane (CF3I).

Numbered Embodiment 13

The refrigerant of any one of numbered embodiments 8 to 12 wherein the refrigerant of three compounds is
2%+/−0.5% by weight HFCO-1233zd(E),
78%+/−0.5% by weight HFO-1234ze(E), and
20%+/−0.5% by weight trifluoroiodomethane (CF3I).

Numbered Embodiment 14

A refrigerant consisting of the following three compounds, with each compound being present in the following relative percentages of:
from 1% by weight to 3% by weight trans-1-chloro-3,3,3-trifluoropropene (HFCO-1233zd(E),
from about 77% by weight to about 83% by weight trans-1,3,3,3-tetrafluoropropene (HFO-1234ze(E), and
from about 15% by weight to about 21% by weight trifluoroiodomethane (CF3I).

Numbered Embodiment 15

The refrigerant of numbered embodiment 14 wherein the refrigerant of three compounds is: from 1% by weight to 3% by weight trans-1-chloro-3,3,3-trifluoropropene (HFCO-1233zd(E),
from about 77% by weight to about 83% by weight trans-1,3,3,3-tetrafluoropropene (HFO-1234ze(E), and
from about 18% by weight to about 21% by weight trifluoroiodomethane (CF3I).

Numbered Embodiment 16

The refrigerant of numbered embodiment 14 or numbered embodiment 15 wherein the refrigerant of three compounds is
from 1% by weight to 3% by weight HFCO-1233zd(E),
from about 77% by weight to about 80% by weight HFO-1234ze(E), and
from about 18% by weight to about 21% by weight trifluoroiodomethane (CF3I).

Numbered Embodiment 17

The refrigerant of any one of numbered embodiments 14 to 16 wherein the HFCO-1233zd(E) is present in an amount of 2%+/−0.5% by weight of the composition.

Numbered Embodiment 18

The refrigerant of any one of numbered embodiments 14 to 17 wherein the refrigerant of three compounds is
2%+/−0.5% by weight HFCO-1233zd(E),
about 78% by weight HFO-1234ze(E), and
about 20% by weight trifluoroiodomethane (CF3I).

Numbered Embodiment 19

The refrigerant of any one of numbered embodiments 14 to 18 wherein the refrigerant of three compounds is
2%+/−0.5% by weight HFCO-1233zd(E),
78%+/−0.5% by weight HFO-1234ze(E), and
20%+/−0.5% by weight trifluoroiodomethane (CF3I).

Numbered Embodiment 20

A heat transfer composition comprising a refrigerant of any one of numbered embodiments 1 to 19.

Numbered Embodiment 21

The heat transfer composition as claimed in numbered embodiment 20, wherein the refrigerant comprises greater than 40% by weight of the composition.

Numbered Embodiment 22

The heat transfer composition as claimed in numbered embodiment 20, wherein the refrigerant comprises greater than 50% by weight of the composition.

Numbered Embodiment 23

The heat transfer composition as claimed in numbered embodiment 20, wherein the refrigerant comprises greater than 60% by weight of the composition.

Numbered Embodiment 24

The heat transfer composition as claimed in numbered embodiment 20 wherein the refrigerant comprises greater than 70% by weight of the composition.

Numbered Embodiment 25

The heat transfer composition as claimed in numbered embodiment 20, wherein the refrigerant comprises greater than 80% by weight of the composition.

Numbered Embodiment 26

The heat transfer composition as claimed in numbered embodiment 20, wherein the refrigerant comprises greater than 90% by weight of the composition.

Numbered Embodiment 27

The heat transfer composition of any one of numbered embodiments 20 to 26 wherein said heat transfer composition further comprising a stabilizer selected from a diene-based compound and/or a phenol-based compound and/or a phosphorus compound and/or a nitrogen compound and/or an epoxide.

Numbered Embodiment 28

The heat transfer composition of any one of numbered embodiments 20 to 27 wherein said heat transfer composition further comprising a stabilizer selected from a diene-based compounds and/or a phenol-based compound and/or a phosphorus compound.

Numbered Embodiment 29

The heat transfer composition of numbered embodiments 27 or 28 wherein the diene based compound is a terpene selected from the group consisting of terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid and vitamin $A_1$, preferably, farnesene.

Numbered Embodiment 30

The heat transfer composition of numbered embodiment 29 wherein the diene based compound is provided in the heat transfer composition in an amount of from greater than 0, preferably from 0.0001% by weight to about 5% by weight, more preferably 0.001% by weight to about 2.5% by weight, most preferably from 0.01% to about 1% by weight.

Numbered Embodiment 31

The heat transfer composition of numbered embodiments 27 or 28 wherein the phosphorus compound is a phosphite or a phosphate compound.

Numbered Embodiment 32

The heat transfer composition of numbered embodiment 31, wherein the phosphite compound is selected from a diaryl, dialkyl, triaryl and/or trialkyl phosphite, and/or a mixed aryl/alkyl di- or tri-substituted phosphite, or one or more compounds selected from hindered phosphites, tris-(di-tert-butylphenyl)phosphite, di-n-octyl phosphite, iso-octyl diphenyl phosphite, iso-decyl diphenyl phosphite, tri-isodecyl phosphate, triphenyl phosphite and diphenyl phosphite, particularly diphenyl phosphite.

Numbered Embodiment 33

The heat transfer composition of numbered embodiment 31, wherein the phosphate compounds is selected from a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

Numbered Embodiment 34

The heat transfer composition of numbered embodiments 31 to 33 wherein the phosphorus compound is provided in the heat transfer composition in an amount of greater than 0, preferably from 0.0001% by weight to about 5% by weight, more preferably 0.001% by weight to about 2.5% by weight, most preferably from 0.01% to about 1% by weight.

Numbered Embodiment 35

The heat transfer composition of any one of numbered embodiments 27 or 28 wherein the stabilizer composition comprises a diene based as claimed in any one of numbered embodiment 29 to 30 and a phosphorous compound as claimed in any one of numbered embodiments 31 to 34.

Numbered Embodiment 36

The heat transfer composition of numbered embodiment 35 wherein the phosphorous compound is a phosphite compound selected from the group consisting of hindered phosphites, tris-(di-tert-butylphenyl)phosphite, di-n-octyl phosphite, iso-decyl diphenyl phosphite and diphenyl phosphite.

Numbered Embodiment 37

The heat transfer composition of any one of numbered embodiments 35 or 36 wherein the phosphorus compounds is provided in the heat transfer composition in an amount of greater than 0, preferably from 0.0001% by weight to about 5% by weight, more preferably 0.001% by weight to about 2.5% by weight, more preferably from 0.01% to about 1% by weight.

Numbered Embodiment 38

The heat transfer composition of any one of numbered embodiments 27 to 37 wherein the stabilizer composition comprises farnesene and diphenyl phosphite.

Numbered Embodiment 39

The heat transfer composition of any one of numbered embodiments 27 to 38, wherein the nitrogen compound is one or more compounds selected from dinitrobenzene, nitrobenzene, nitromethane, nitrosobenzene, and TEMPO [(2,2,6,6-tetramethylpiperidin-1-yl)oxyl], preferably dinitrobenzene.

Numbered Embodiment 40

The heat transfer composition of any one of numbered embodiments 27 to 39 wherein the nitrogen compound is provided in the heat transfer composition in an amount of greater than 0, preferably from 0.0001% by weight to about 5% by weight, more preferably 0.001% by weight to about 2.5% by weight, most preferably from 0.01% to about 1% by weight.

Numbered Embodiment 41

The heat transfer composition of any one of numbered embodiments 27 to 40 wherein the phenol compound is BHT.

Numbered Embodiment 42

The heat transfer composition of any one of numbered embodiment 27 to 40 wherein the phenol compound is provided in the heat transfer composition in an amount of greater than 0, preferably from 0.0001% by weight to about 5% by weight, more preferably 0.001% by weight to about 2.5% by weight, most preferably from 0.01% to about 1% by weight.

Numbered Embodiment 43

The heat transfer composition of any one of numbered embodiments 27 to 42 wherein the phenol compound is BHT, wherein said BHT is present in an amount of from about 0.0001% by weight to about 5% by weight based on the weight of heat transfer composition.

Numbered Embodiment 44

The heat transfer composition any one of numbered embodiments 27 to 43 comprising a stabilizer composition comprising farnesene, diphenyl phosphite and BHT, wherein the farnesene is provided in an amount of from about 0.0001% by weight to about 5% by weight based on the weight of the heat transfer composition, the diphenyl phosphite is provided in an amount of from about 0.0001% by weight to about 5% by weight based on the weight of the heat transfer composition and the BHT is provided in an amount of from about 0.0001% by weight to about 5% by weight based on the weight of heat transfer composition.

Numbered Embodiment 45

The heat transfer composition of any one of numbered embodiments 20 to 44 further comprising a lubricant selected from the group consisting of polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs) and polyvinyl ethers (PVE), particularly from polyol esters (POEs), mineral oil and alkylbenzenes (ABs), most preferably from polyol esters (POEs).

Numbered Embodiment 46

The heat transfer composition of numbered embodiment 45 wherein the lubricant is selected from polyol esters (POEs), polyalkylene glycols (PAGs), mineral oil, alkylbenzenes (ABs) and polyvinyl ethers (PVE).

Numbered Embodiment 47

The heat transfer composition of numbered embodiment 45 wherein the lubricant is selected from polyol esters (POEs), mineral oil, alkylbenzenes (ABs) and polyvinyl ethers (PVE).

Numbered Embodiment 48

The heat transfer composition of numbered embodiment 45 wherein the lubricant is selected from polyol esters (POEs), mineral oil and alkylbenzenes (ABs).

Numbered Embodiment 49

The heat transfer composition of numbered embodiment 45 wherein the lubricant is a polyol ester (POE).

Numbered Embodiment 50

The heat transfer composition of any one of numbered embodiment 45 to 49 wherein the lubricant is present in the heat transfer composition in an amount of from 5 to 60% by weight.

Numbered Embodiment 51

The heat transfer composition of any one of numbered embodiment 45 to 49 wherein the lubricant is present in the heat transfer composition in an amount of from 30 to 50% by weight.

Numbered Embodiment 52

The heat transfer composition of any one of numbered embodiment 45 to 49 wherein the lubricant is present in the heat transfer composition in an amount of from about 10 to 60% by weight of the system using the heat transfer composition.

Numbered Embodiment 53

The heat transfer composition of any one of numbered embodiment 45 to 49 wherein the lubricant is present in the heat transfer composition in an amount of from about 20 to about 50% by weight of the system using the heat transfer composition.

Numbered Embodiment 54

The heat transfer composition of any one of numbered embodiment 45 to 49 wherein the lubricant is present in the heat transfer composition in an amount of from about 20 to about 40% by weight of the system using the heat transfer composition.

Numbered Embodiment 55

The heat transfer composition of any one of numbered embodiment 45 to 49 wherein the lubricant is present in the heat transfer composition in an amount of from about 20 to about 30% by weight of the system using the heat transfer composition.

Numbered Embodiment 56

The heat transfer composition of any one of numbered embodiment 45 to 49 wherein the lubricant is present in the heat transfer composition in an amount of from about 30 to about 50% by weight of the system using the heat transfer composition.

Numbered Embodiment 57

The heat transfer composition of any one of numbered embodiment 45 to 49 wherein the lubricant is present in the heat transfer composition in an amount of from about 30 to about 40% by weight of the system using the heat transfer composition.

Numbered Embodiment 58

The heat transfer composition of any one of numbered embodiment 45 to 49 wherein the lubricant is present in the heat transfer composition in an amount of from about 5 to about 10% by weight of the system using the heat transfer composition.

Numbered Embodiment 59

The heat transfer composition of any one of numbered embodiment 45 to 49 wherein the lubricant is present in the heat transfer composition in an amount of from around about 8% by weight of the system using the heat transfer composition.

Numbered Embodiment 60

The heat transfer composition of any one of numbered embodiment 45 to 49 wherein the lubricant is present in the heat transfer composition in an amount of from 10 to 60% by weight and wherein the lubricant is a polyol ester (POE) lubricant.

Numbered Embodiment 61

The heat transfer composition of any one of numbered embodiments 20 to 26 wherein the heat transfer composition consists essentially of the refrigerant as claimed in any one of numbered embodiments 1 to 19.

Numbered Embodiment 62

The heat transfer composition of any one of numbered embodiments 20 to 26 wherein the heat transfer composition consist essentially of the refrigerant as claimed in any one of claims 1 to 19 and the stabilizer composition as claimed in any one of numbered embodiment 27 to 44.

Numbered Embodiment 63

The heat transfer composition of any one of numbered embodiments 20 to 26 wherein the heat transfer composition consist essentially of the refrigerant as claimed in any one of numbered embodiment 1 to 19, the stabilizer composition as claimed in any one of numbered embodiments 27 to 44 and the lubricant as claimed in any one of numbered embodiment 45 to 60.

Numbered Embodiment 64

The heat transfer composition of any one of numbered embodiments 20 to 63 having a Global Warming Potential (GWP) of less than 150.

Numbered Embodiment 65

The heat transfer composition of any one of numbered embodiments 20 to 64 having an Ozone Depletion Potential (ODP) of not greater than 0.05, preferably 0.02, more preferably about zero.

Numbered Embodiment 66

A low temperature refrigeration system containing a refrigerant of any one of numbered embodiments 1-19 or a heat transfer composition of any one of numbered embodiments 20 to 64.

Numbered Embodiment 67

A medium temperature refrigeration system containing a refrigerant of any one of numbered embodiments 1-19 or a heat transfer composition of any one of numbered embodiments 20 to 64.

Numbered Embodiment 68

A heat pump containing a refrigerant of any one of numbered embodiments 1-19 or a heat transfer composition of any one of numbered embodiments 20 to 64.

Numbered Embodiment 69

A dehumidifier containing a refrigerant of any one of numbered embodiments 1-19 or a heat transfer composition of any one of numbered embodiments 20 to 64.

Numbered Embodiment 70

A vending machine containing a refrigerant of any one of numbered embodiments 1-19 or a heat transfer composition of any one of numbered embodiments 20 to 64.

Numbered Embodiment 71

A chiller containing a refrigerant of any one of numbered embodiments 1-19 or a heat transfer composition of any one of numbered embodiments 20 to 64.

Numbered Embodiment 72

A refrigerator containing a refrigerant of any one of numbered embodiments 1-19 or a heat transfer composition of any one of numbered embodiments 20 to 64.

Numbered Embodiment 73

A freezer containing a refrigerant of any one of numbered embodiments 1-19 or a heat transfer composition of any one of numbered embodiments 20 to 64.

Numbered Embodiment 74

A cascade refrigeration system containing a refrigerant of any one of numbered embodiments 1-19 or a heat transfer composition of any one of numbered embodiments 20 to 64.

Numbered Embodiment 75

A refrigerant comprising at least about 97% by weight of the following four compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and from about 6.6% by weight to about 20.6% by weight trifluoroiodomethane (CF$_3$I).

Numbered Embodiment 76

A refrigerant comprising at least about 98.5% by weight of the following three compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane (CF3I).

Numbered Embodiment 77

A refrigerant comprising at least about 99.5% by weight of the following three compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane (CF3I).

Numbered Embodiment 78

A refrigerant consisting essentially of the following four compounds, with each compound being present in the following relative percentages:
from 1% by weight to 2%+/−0.5% by weight trans-1-chloro-3,3,3-trifluoropropene (HFCO-1233zd(E)),
from about 73% by weight to about 87% by weight trans-1,3,3,3-tetrafluoropropene (HFO-1234ze(E)),
4.4%+/−0.5% by weight 1,1,1,2,3,3,3-heptafluoropropane (HFC-227ea), and
from about 6.6% by weight to about 20.6% by weight trifluoroiodomethane (CF$_3$I).

Numbered Embodiment 79

A refrigerant comprising at least about 98.5% by weight of the following four compounds, with each compound being present in the following relative percentages:
2%+/−0.5% by weight trans-1-chloro-3,3,3-trifluoropropene (HFCO-1233zd(E)),
about 84% by weight trans-1,3,3,3-tetrafluoropropene (HFO-1234ze(E)),
4.4%+/−0.5% by weight 1,1,1,2,3,3,3-heptafluoropropane (HFC-227ea), and
about 9.6% by weight trifluoroiodomethane (CF3I).

Numbered Embodiment 80 trifluoropropene (HFCO-1233zd(E)),
about 84% by weight trans-1,3,3,3-tetrafluoropropene (HFO-1234ze(E)),
4.4%+/−0.5% by weight 1,1,1,2,3,3,3-heptafluoropropane (HFC-227ea), and
about 9.6% by weight trifluoroiodomethane (CF3I).

Numbered Embodiment 81

A refrigerant consisting of the following four compounds, with each compound being present in the following relative percentages:
2%+/−0.5% by weight trans-1-chloro-3,3,3-trifluoropropene (HFCO-1233zd(E)),
about 84% by weight trans-1,3,3,3-tetrafluoropropene (HFO-1234ze(E)),
4.4%+/−0.5% by weight 1,1,1,2,3,3,3-heptafluoropropane (HFC-227ea), and
about 9.6% by weight trifluoroiodomethane (CF3I).

Numbered Embodiment 82

A refrigerant comprising at least about 98.5% by weight of the following four compounds, with each compound being present in the following relative percentages:
2%+/−0.5% by weight trans-1-chloro-3,3,3-trifluoropropene (HFCO-1233zd(E)),
84%+/−0.5% by weight trans-1,3,3,3-tetrafluoropropene (HFO-1234ze(E)),
4.4%+/−0.5% by weight 1,1,1,2,3,3,3-heptafluoropropane (HFC-227ea), and
9.6%+/−0.5% by weight trifluoroiodomethane (CF3I).

Numbered Embodiment 83

A refrigerant consisting essentially of the following four compounds, with each compound being present in the following relative percentages:
2%+/−0.5% by weight trans-1-chloro-3,3,3-trifluoropropene (HFCO-1233zd(E)),
84%+/−0.5% by weight trans-1,3,3,3-tetrafluoropropene (HFO-1234ze(E)),
4.4%+/−0.5% by weight 1,1,1,2,3,3,3-heptafluoropropane (HFC-227ea), and 9.6%+/−0.5% by weight trifluoroiodomethane (CF3I).

Numbered Embodiment 84

A refrigerant comprising consisting of the following four compounds, with each compound being present in the following relative percentages:
2%+/−0.5% by weight trans-1-chloro-3,3,3-trifluoropropene (HFCO-1233zd(E)),
84%+/−0.5% by weight trans-1,3,3,3-tetrafluoropropene (HFO-1234ze(E)),
4.4%+/−0.5% by weight 1,1,1,2,3,3,3-heptafluoropropane (HFC-227ea), and
9.6%+/−0.5% by weight trifluoroiodomethane (CF3I).

Numbered Embodiment 85

A heat transfer composition comprising a refrigerant of any one of numbered embodiments 75 to 84.

Numbered Embodiment 86

The heat transfer composition as claimed in numbered embodiment 85, wherein the refrigerant comprises greater than 40% by weight of the composition.

Numbered Embodiment 87

The heat transfer composition as claimed in numbered embodiment 85, wherein the refrigerant comprises greater than 50% by weight of the composition.

Numbered Embodiment 88

The heat transfer composition as claimed in numbered embodiment 85, wherein the refrigerant comprises greater than 60% by weight of the composition.

Numbered Embodiment 89

The heat transfer composition as claimed in numbered embodiment 85 wherein the refrigerant comprises greater than 70% by weight of the composition.

Numbered Embodiment 90

The heat transfer composition as claimed in numbered embodiment 85, wherein the refrigerant comprises greater than 80% by weight of the composition.

Numbered Embodiment 91

The heat transfer composition as claimed in numbered embodiment 85, wherein the refrigerant comprises greater than 90% by weight of the composition.

Numbered Embodiment 92

The heat transfer composition of any one of numbered embodiments 85 to 91 wherein said heat transfer composition further comprises a stabilizer selected from a diene-based compound and/or a phenol-based compound and/or a phosphorus compound and/or a nitrogen compound and/or an epoxide.

Numbered Embodiment 93

The heat transfer composition of any one of numbered embodiments 85 to 91 wherein said heat transfer composition further comprises a stabilizer selected from a diene-based compounds and/or a phenol-based compound and/or a phosphorus compound.

Numbered Embodiment 94

The heat transfer composition of numbered embodiments 92 or 93 wherein the diene based compound is a terpene selected from the group consisting of terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid and vitamin $A_1$, preferably, farnesene.

Numbered Embodiment 95

The heat transfer composition of numbered embodiment 94 wherein the diene based compound is provided in the heat transfer composition in an amount of from greater than 0, preferably from 0.0001% by weight to about 5% by weight, more preferably 0.001% by weight to about 2.5% by weight, most preferably from 0.01% to about 1% by weight.

Numbered Embodiment 96

The heat transfer composition of numbered embodiments 85 to 95 wherein a phosphorous compound is present and wherein the phosphorus compound is a phosphite or a phosphate compound.

Numbered Embodiment 97

The heat transfer composition of numbered embodiment 96, wherein the phosphite compound is selected from a diaryl, dialkyl, triaryl and/or trialkyl phosphite, and/or a mixed aryl/alkyl di- or tri-substituted phosphite, or one or more compounds selected from hindered phosphites, tris-(di-tert-butylphenyl)phosphite, di-n-octyl phosphite, iso-octyl diphenyl phosphite, iso-decyl diphenyl phosphite, tri-iso-decyl phosphate, triphenyl phosphite and diphenyl phosphite, particularly diphenyl phosphite.

Numbered Embodiment 98

The heat transfer composition of numbered embodiment 96, wherein the phosphate compounds is selected from a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

Numbered Embodiment 99

The heat transfer composition of numbered embodiments 97 or 98 wherein the phosphorus compound is provided in the heat transfer composition in an amount of greater than 0, preferably from 0.0001% by weight to about 5% by weight, more preferably 0.001% by weight to about 2.5% by weight, most preferably from 0.01% to about 1% by weight.

Numbered Embodiment 100

The heat transfer composition of any one of numbered embodiments 97 or 98 wherein the stabilizer composition comprises a diene based as claimed in any one of numbered embodiment 29 to 30 and a phosphorous compound as claimed in any one of numbered embodiments 31 to 34.

Numbered Embodiment 101

The heat transfer composition of numbered embodiment 100 wherein the phosphorous compound is a phosphite compound selected from the group consisting of hindered phosphites, tris-(di-tert-butylphenyl)phosphite, di-n-octyl phosphite, iso-decyl diphenyl phosphite and diphenyl phosphite.

Numbered Embodiment 102

The heat transfer composition of any one of numbered embodiments 100 or 101 wherein the phosphorus compounds is provided in the heat transfer composition in an amount of greater than 0, preferably from 0.0001% by weight to about 5% by weight, more preferably 0.001% by weight to about 2.5% by weight, more preferably from 0.01% to about 1% by weight.

Numbered Embodiment 103

The heat transfer composition of any one of numbered embodiments 92 to 102 wherein the stabilizer composition comprises farnesene and diphenyl phosphite.

Numbered Embodiment 104

The heat transfer composition of any one of numbered embodiments 92 to 103, wherein the nitrogen compound is one or more compounds selected from dinitrobenzene, nitrobenzene, nitromethane, nitrosobenzene, and TEMPO [(2,2,6,6-tetramethylpiperidin-1-yl)oxyl], preferably dinitrobenzene.

Numbered Embodiment 105

The heat transfer composition of any one of numbered embodiments 92 to 104 wherein the nitrogen compound is provided in the heat transfer composition in an amount of greater than 0, preferably from 0.0001% by weight to about 5% by weight, more preferably 0.001% by weight to about 2.5% by weight, most preferably from 0.01% to about 1% by weight.

Numbered Embodiment 106

The heat transfer composition of any one of numbered embodiments 92 to 105 wherein the phenol compound is BHT.

Numbered Embodiment 107

The heat transfer composition of any one of numbered embodiment 92 to 105 wherein the phenol compound is provided in the heat transfer composition in an amount of greater than 0, preferably from 0.0001% by weight to about 5% by weight, more preferably 0.001% by weight to about 2.5% by weight, most preferably from 0.01% to about 1% by weight.

Numbered Embodiment 108

The heat transfer composition of any one of numbered embodiments 92 to 105 wherein the phenol compound is BHT, wherein said BHT is present in an amount of from about 0.0001% by weight to about 5% by weight based on the weight of heat transfer composition.

Numbered Embodiment 109

The heat transfer composition any one of numbered embodiments 92 to 105 comprising a stabilizer composition comprising farnesene, diphenyl phosphite and BHT, wherein the farnesene is provided in an amount of from about 0.0001% by weight to about 5% by weight based on the weight of the heat transfer composition, the diphenyl phosphite is provided in an amount of from about 0.0001% by weight to about 5% by weight based on the weight of the heat transfer composition and the BHT is provided in an amount of from about 0.0001% by weight to about 5% by weight based on the weight of heat transfer composition.

Numbered Embodiment 110

The heat transfer composition of any one of numbered embodiments 95 to 109 further comprising a lubricant selected from the group consisting of polyol esters (POEs), polyalkylene glycols (PAGs), mineral oil, alkylbenzenes (ABs) and polyvinyl ethers (PVE), more preferably from polyol esters (POEs), mineral oil, alkylbenzenes (ABs) and polyvinyl ethers (PVE), particularly from polyol esters (POEs), mineral oil and alkylbenzenes (ABs), most preferably from polyol esters (POEs).

Numbered Embodiment 111

The heat transfer composition of numbered embodiment 110 wherein the lubricant is selected from polyol esters (POEs), polyalkylene glycols (PAGs), mineral oil, alkylbenzenes (ABs) and polyvinyl ethers (PVE).

Numbered Embodiment 112

The heat transfer composition of numbered embodiment 110 wherein the lubricant is selected from polyol esters (POEs), mineral oil, alkylbenzenes (ABs) and polyvinyl ethers (PVE).

Numbered Embodiment 113

The heat transfer composition of numbered embodiment 110 wherein the lubricant is selected from polyol esters (POEs), mineral oil and alkylbenzenes (ABs).

Numbered Embodiment 114

The heat transfer composition of numbered embodiment 110 wherein the lubricant is a polyol ester (POE).

Numbered Embodiment 115

The heat transfer composition of any one of numbered embodiment 110 to 114 wherein the lubricant is present in the heat transfer composition in an amount of from 5 to 60% by weight.

Numbered Embodiment 116

The heat transfer composition of any one of numbered embodiment 110 to 114 wherein the lubricant is present in the heat transfer composition in an amount of from 30 to 50% by weight.

Numbered Embodiment 117

The heat transfer composition of any one of numbered embodiment 110 to 114 wherein the lubricant is present in the heat transfer composition in an amount of from about 10 to 60% by weight of the system using the heat transfer composition.

Numbered Embodiment 118

The heat transfer composition of any one of numbered embodiment 110 to 114 wherein the lubricant is present in the heat transfer composition in an amount of from about 20 to about 50% by weight of the system using the heat transfer composition.

Numbered Embodiment 119

The heat transfer composition of any one of numbered embodiment 110 to 114 wherein the lubricant is present in the heat transfer composition in an amount of from about 20 to about 40% by weight of the system using the heat transfer composition.

Numbered Embodiment 120

The heat transfer composition of any one of numbered embodiment 110 to 114 wherein the lubricant is present in the heat transfer composition in an amount of from about 20 to about 30% by weight of the system using the heat transfer composition.

Numbered Embodiment 121

The heat transfer composition of any one of numbered embodiment 110 to 114 wherein the lubricant is present in the heat transfer composition in an amount of from about 30 to about 50% by weight of the system using the heat transfer composition.

Numbered Embodiment 122

The heat transfer composition of any one of numbered embodiment 110 to 114 wherein the lubricant is present in the heat transfer composition in an amount of from about 30 to about 40% by weight of the system using the heat transfer composition.

Numbered Embodiment 123

The heat transfer composition of any one of numbered embodiment 110 to 114 wherein the lubricant is present in the heat transfer composition in an amount of from about 5 to about 10% by weight of the system using the heat transfer composition.

Numbered Embodiment 124

The heat transfer composition of any one of numbered embodiment 110 to 114 wherein the lubricant is present in the heat transfer composition in an amount of from around about 8% by weight of the system using the heat transfer composition.

Numbered Embodiment 125

The heat transfer composition of any one of numbered embodiment 110 to 114 wherein the lubricant is present in the heat transfer composition in an amount of from 10 to 60% by weight and wherein the lubricant is a polyol ester (POE) lubricant.

Numbered Embodiment 126

The heat transfer composition of any one of numbered embodiments 95 to 101 wherein the heat transfer composition consists essentially of the refrigerant as claimed in any one of numbered embodiments 75 to 94.

Numbered Embodiment 127

The heat transfer composition of any one of numbered embodiments 75 to 94 wherein the heat transfer composition consist essentially of the refrigerant as claimed in any one of claims 75 to 84 and the stabilizer composition as claimed in any one of numbered embodiment 92 to 109.

Numbered Embodiment 128

The heat transfer composition of any one of numbered embodiments 92 to 109 wherein the heat transfer composition consist essentially of the refrigerant as claimed in any one of numbered embodiment 75 to 84, the stabilizer composition as claimed in any one of numbered embodiments 92 to 109 and the lubricant as claimed in any one of numbered embodiment 110 to 125.

Numbered Embodiment 129

The heat transfer composition of any one of numbered embodiments 85 to 128 having a Global Warming Potential (GWP) of less than 150.

Numbered Embodiment 130

The heat transfer composition of any one of numbered embodiments 85 to 128 having an Ozone Depletion Potential (ODP) of not greater than 0.05, preferably 0.02, more preferably about zero.

Numbered Embodiment 131

A low temperature refrigeration system containing a refrigerant of any one of numbered embodiments 75-84 or a heat transfer composition of any one of numbered embodiments 85 to 128.

Numbered Embodiment 132

A medium temperature refrigeration system containing a refrigerant of any one of numbered embodiments 75-84 or a heat transfer composition of any one of numbered embodiments 85 to 128.

Numbered Embodiment 133

A heat pump containing a refrigerant of any one of numbered embodiments 75-84 or a heat transfer composition of any one of numbered embodiments 85 to 128.

Numbered Embodiment 134

A dehumidifier containing a refrigerant of any one of numbered embodiments 75-84 or a heat transfer composition of any one of numbered embodiments 84 to 128.

Numbered Embodiment 135

A vending machine containing a refrigerant of any one of numbered embodiments 75-84 or a heat transfer composition of any one of numbered embodiments 84 to 128.

Numbered Embodiment 136

A chiller containing a refrigerant of any one of numbered embodiments 75-84 or a heat transfer composition of any one of numbered embodiments 84 to 128.

Numbered Embodiment 137

A refrigerator containing a refrigerant of any one of numbered embodiments 75-84 or a heat transfer composition of any one of numbered embodiments 85 to 128.

Numbered Embodiment 138

A freezer containing a refrigerant of any one of numbered embodiments 75-49 or a heat transfer composition of any one of numbered embodiments 85 to 128.

Numbered Embodiment 139

A cascade refrigeration system containing a refrigerant of any one of numbered embodiments 75-84 or a heat transfer composition of any one of numbered embodiments 85 to 128.

Although the invention has been described with reference to preferred embodiments, it will be understood by those skilled in the art that various changes may be made and equivalents substituted for elements thereof without departing from the scope of the invention. In addition, many modifications may be made to adapt to a particular situation or material to the teachings of the invention with departing from the essential scope thereof. Therefore, it 15 is intended that the invention not be limited to the particular embodiments disclosed, but that the invention will include all embodiments falling within the scope of the appended claims or any claims added later.

The invention claimed is:

1. A heat transfer system comprising a refrigerant consisting essentially of at least about 97% by weight of the following four compounds, with each compound being present in the following relative percentages:
   from 1% by weight to 2%+/−0.5% by weight trans-1-chloro-3,3,3-trifluoropropene (HFCO-1233zd(E)),
   from about 73% by weight to about 87% by weight trans-1,3,3,3-tetrafluoropropene (HFO-1234ze(E)),
   4.4%+/−0.5% by weight 1,1,1,2,3,3,3-heptafluoropropane (HFC-227ea), and
   from about 6.6% by weight to about 20.6% by weight trifluoroiodomethane ($CF_3I$).

2. The heat transfer system of claim 1 wherein said system comprises one or more of a medium temperature refrigeration system, a vending machine, a heat pump, a transport refrigeration system, an air conditioning system and combinations of these.

3. The heat transfer system of claim 2 wherein said system further contains a POE lubricant or a PVE lubricant.

4. The heat transfer system of claim 3 wherein system contains a heat transfer composition comprising said refrigerant and said lubricant and further comprises a stabilizer and/or a sequestration material.

5. The heat transfer system of claim 3 further comprising a stabilizer and/or a sequestration material.

6. A heat transfer system comprising a refrigerant consisting essentially of at least about 97% by weight of the following three compounds, with each compound being present in the following relative percentages:
   from 1% by weight to 3% by weight trans-1-chloro-3,3,3-trifluoropropene (HFCO-1233zd(E),
   from about 77% by weight to about 83% by weight trans-1,3,3,3-tetrafluoropropene (HFO-1234ze(E), and
   from about 15% by weight to about 21% by weight trifluoroiodomethane (CF3I).

7. The heat transfer system of claim 6 wherein said system comprises one or more of a medium temperature refrigeration system, a vending machine, a heat pump, a transport refrigeration system, an air conditioning system and combinations of these.

8. The heat transfer system of claim 7 wherein said system further contains a POE lubricant or a PVE.

9. The heat transfer system of claim 8 wherein said system further contain a stabilizer and/or a sequestration material.

10. The heat transfer system of claim 8 wherein said system contains a stabilizer and a sequestration material in contact with at least a portion of said refrigerant.

11. The heat transfer system of claim 1 wherein said refrigerant consists essentially of at least about 97% by weight of the following four compounds, with each compound being present in the following relative percentages:
   about 2% by weight trans-1-chloro-3,3,3-trifluoropropene (HFCO-1233zd(E)),
   about 84% by weight trans-1,3,3,3-tetrafluoropropene (HFO-1234ze(E)),
   about 4.4% by weight 1,1,1,2,3,3,3-heptafluoropropane (HFC-227ea), and
   about 9.6% by weight trifluoroiodomethane ($CF_3I$).

12. A method of cooling and/or heating in a heat transfer system comprising an evaporator, a condenser and a compressor, the method comprising the steps of:
   i) providing a heat transfer system selected from the group consisting of a medium temperature refrigeration system, a vending machine, a heat pump, a transport refrigeration system and an air conditioning system and combinations of these;
   ii) condensing a refrigerant consisting essentially of at least about 97% by weight of the following four compounds, with each compound being present in the following relative percentages:
      a) from 1% by weight to 2%+/−0.5% by weight trans-1-chloro-3,3,3-trifluoropropene (HFCO-1233zd(E)),
      b) from about 73% by weight to about 87% by weight trans-1,3,3,3-tetrafluoropropene (HFO-1234ze(E)),
      c) 4.4%+/−0.5% by weight 1,1,1,2,3,3,3-heptafluoropropane (HFC-227ea), and
      d) from about 6.6% by weight to about 20.6% by weight trifluoroiodomethane ($CF_3I$); and
   iii) evaporating said refrigerant in the vicinity of a body, fluid or article to be cooled, wherein the evaporator temperature of the heat transfer system is in the range of from about −40° C. to about 10° C.

13. The method of claim 12 wherein the heat transfer system comprises a medium temperature refrigeration system.

14. The method of claim 12 wherein the heat transfer system comprises a vending machine.

15. The method of claim 12 wherein the heat transfer system comprises a heat pump.

16. The method of claim 12 wherein the heat transfer system comprises a transport refrigeration system.

* * * * *